US008872746B2

(12) United States Patent  (10) Patent No.: US 8,872,746 B2
Cheong et al.  (45) Date of Patent: Oct. 28, 2014

(54) DISPLAY OPERABLE IN BOTH REFLECTIVE AND TRANSMISSIVE MODES

(75) Inventors: Byoungho Cheong, Yongin-si (KR); Jaeho You, Hwaseong-si (KR); TaeWoo Kim, Seongnam-si (KR); Eun-Ae Kwak, Gunpo-si (KR); Jaechang Kim, Busan (KR); Taehoon Yoon, Busan (KR); Kihan Kim, Changwon-si (KR)

(73) Assignee: Samsung Display Co., Ltd. (KR)

( * ) Notice: Subject to any disclaimer, the term of this patent is extended or adjusted under 35 U.S.C. 154(b) by 407 days.

(21) Appl. No.: 13/222,981

(22) Filed: Aug. 31, 2011

(65) Prior Publication Data

US 2012/0062527 A1  Mar. 15, 2012

(30) Foreign Application Priority Data

Sep. 14, 2010 (KR) ........................ 10-2010-0090188

(51) Int. Cl.
 *G09G 3/36* (2006.01)
 *G02F 1/1347* (2006.01)
 *G02F 1/1335* (2006.01)

(52) U.S. Cl.
 CPC .. *G02F 1/1347* (2013.01); *G02F 2001/133531* (2013.01)
 USPC .......................................... 345/98; 349/113

(58) Field of Classification Search
 CPC ....... G02F 1/1335; G02F 1/1347; G02F 1/13; G02F 1/1343; G02F 1/139
 USPC .......................................... 345/98; 349/113
 See application file for complete search history.

(56) References Cited

U.S. PATENT DOCUMENTS

| 6,169,708 | B1 | 1/2001 | Kaneko et al. | |
|---|---|---|---|---|
| 6,443,585 | B1 | 9/2002 | Saccomanno | |
| 6,897,914 | B2 | 5/2005 | Yoshida | |
| 6,999,147 | B2 | 2/2006 | Maeda | |
| 2004/0001173 | A1* | 1/2004 | Yamauchi | 349/113 |
| 2006/0208993 | A1* | 9/2006 | Jung | 345/98 |
| 2008/0273145 | A1* | 11/2008 | Akiyama | 349/84 |
| 2009/0262268 | A1* | 10/2009 | Matsumoto et al. | 349/15 |
| 2009/0284672 | A1* | 11/2009 | Baek et al. | 349/33 |

FOREIGN PATENT DOCUMENTS

| JP | 2002-182212 | 6/2002 |
|---|---|---|
| JP | 2004-069835 | 3/2004 |
| JP | 2004-333999 | 11/2004 |
| JP | 2009-175756 | 8/2009 |
| KR | 1020030021850 A | 3/2003 |
| KR | 1020030091744 A | 12/2003 |
| KR | 1020050024946 A | 3/2005 |
| KR | 100962109 B1 | 6/2010 |
| KR | 1020110014904 A | 2/2011 |

* cited by examiner

*Primary Examiner* — Kevin M Nguyen
(74) *Attorney, Agent, or Firm* — Innovation Counsel LLP

(57) ABSTRACT

A display apparatus includes a first display panel with a plurality of first pixels, a second display panel facing the first display panel and having a plurality of second pixels, a light reflective polarizer, and a backlight unit. The light reflective polarizer is interposed between the first and second display panels to transmit light polarized in a first direction, and reflect light polarized in a second direction substantially perpendicular to the first direction. The backlight unit is arranged proximate to the second display panel to supply light to the first and second display panels. The first display panel displays an image by using reflected ambient light, and the second display panel displays an image by using light from the backlight unit.

10 Claims, 20 Drawing Sheets

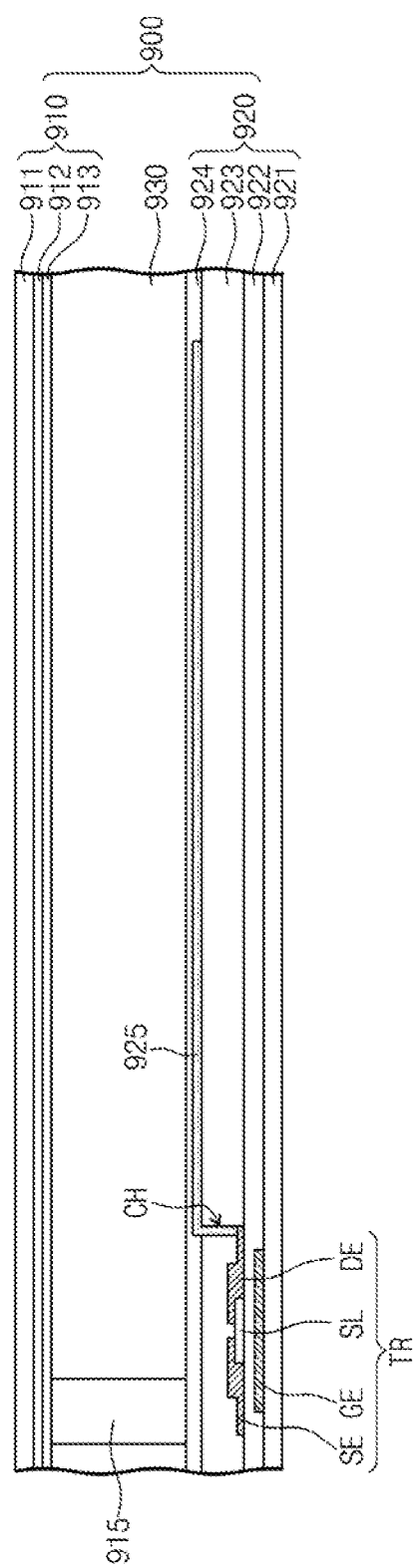

DISPLAY OPERABLE IN BOTH REFLECTIVE AND TRANSMISSIVE MODES

CROSS-REFERENCE TO RELATED APPLICATION

This application claims priority to, and the benefit of, Korean Patent Application No. 2010-90188 filed on Sep. 14, 2010, the contents of which are herein incorporated by reference in their entirety.

BACKGROUND

1. Field of disclosure

Embodiments of the present invention relate generally to flat panel displays. More particularly, embodiments of the present invention relate to a display apparatus capable of being used as a transmissive type or a reflective type display.

2. Description of the Related Art

In general, a liquid crystal display (LCD) includes a first substrate, a second substrate facing the first substrate, and a liquid crystal layer interposed between the first and second substrates. The LCD displays an image according to an electric field applied to the liquid crystal layer.

Since liquid crystal contained in the liquid crystal layer is a non-emissive material, a separate light source typically supplies light to the liquid crystal layer. In general, LCDs are often classified into a reflective display apparatus, a transmissive display apparatus, and a transflective display apparatus according to the type of light supplied to the liquid crystal layer. In particular, the reflective display apparatus uses external (e.g., ambient) light, the transmissive display apparatus uses light provided from a backlight unit, and the transflective display apparatus uses both light provided from a backlight unit and external light.

In a transflective display apparatus, one pixel is generally divided into a transmissive region and a reflective region. Accordingly, the transflective display apparatus has low efficiency of using light when the transflective display apparatus is used in a transmissive mode or a reflective mode.

SUMMARY

Exemplary embodiments of the present invention provide a display apparatus capable of being used as a transmissive type or a reflective type while having improved display characteristics.

According to exemplary embodiments, a display apparatus includes a first display panel with a plurality of first pixels, a second display panel facing the first display panel and having a plurality of second pixels, a light reflective polarizer, and a backlight unit.

The light reflective polarizer is interposed between the first and second display panels to transmit light polarized in a first direction, and to reflect light polarized in a second direction substantially perpendicular to the first direction. The backlight unit is positioned proximate to the second display panel to supply light to the first and second display panels.

According to other exemplary embodiments, a display apparatus includes a first display panel, a second display panel, and a backlight unit.

The first display panel includes a first liquid crystal layer including cholesteric liquid crystal with a reflection region having a wavelength shorter than or longer than a wavelength of visible light. The first display panel also includes a plurality of first pixels. The second display panel faces the first display panel and includes a plurality of second pixels. The backlight unit is positioned proximate to the second display panel to supply light to the first and second display panels.

According to further exemplary embodiments, a display apparatus includes a first substrate, a second substrate facing the first substrate, a cholesteric liquid crystal layer, a plurality of pixels, and a backlight unit.

The cholesteric liquid crystal layer is interposed between the first and second substrates, and includes a reflection region having a wavelength shorter than or longer than a wavelength of visible light. The pixels are provided on the first substrate or the second substrate. The backlight unit is positioned proximate to the second substrate to supply light to the first and second substrates. When substantially no electric field is applied to the cholesteric liquid crystal layer, it is maintained in a planar state, so as to transmit light. When an electric field is applied to the cholesteric liquid crystal layer, it is maintained in a focal conic state to scatter incident light.

As described above, the image can be displayed through the first display panel when the display apparatus is used in reflective mode, and can be displayed through the second display panel when the display apparatus is used in transmissive mode. Accordingly, light use efficiency can be increased, and power consumption can be reduced. When the display apparatus is used in the reflective mode, the first display panel is utilized, so that a parallax phenomenon can be reduced.

BRIEF DESCRIPTION OF THE DRAWINGS

FIG. 10 is a sectional view showing the display panel of FIG. 9 according to an exemplary embodiment of the present invention.

DETAILED DESCRIPTION

Figure 1:
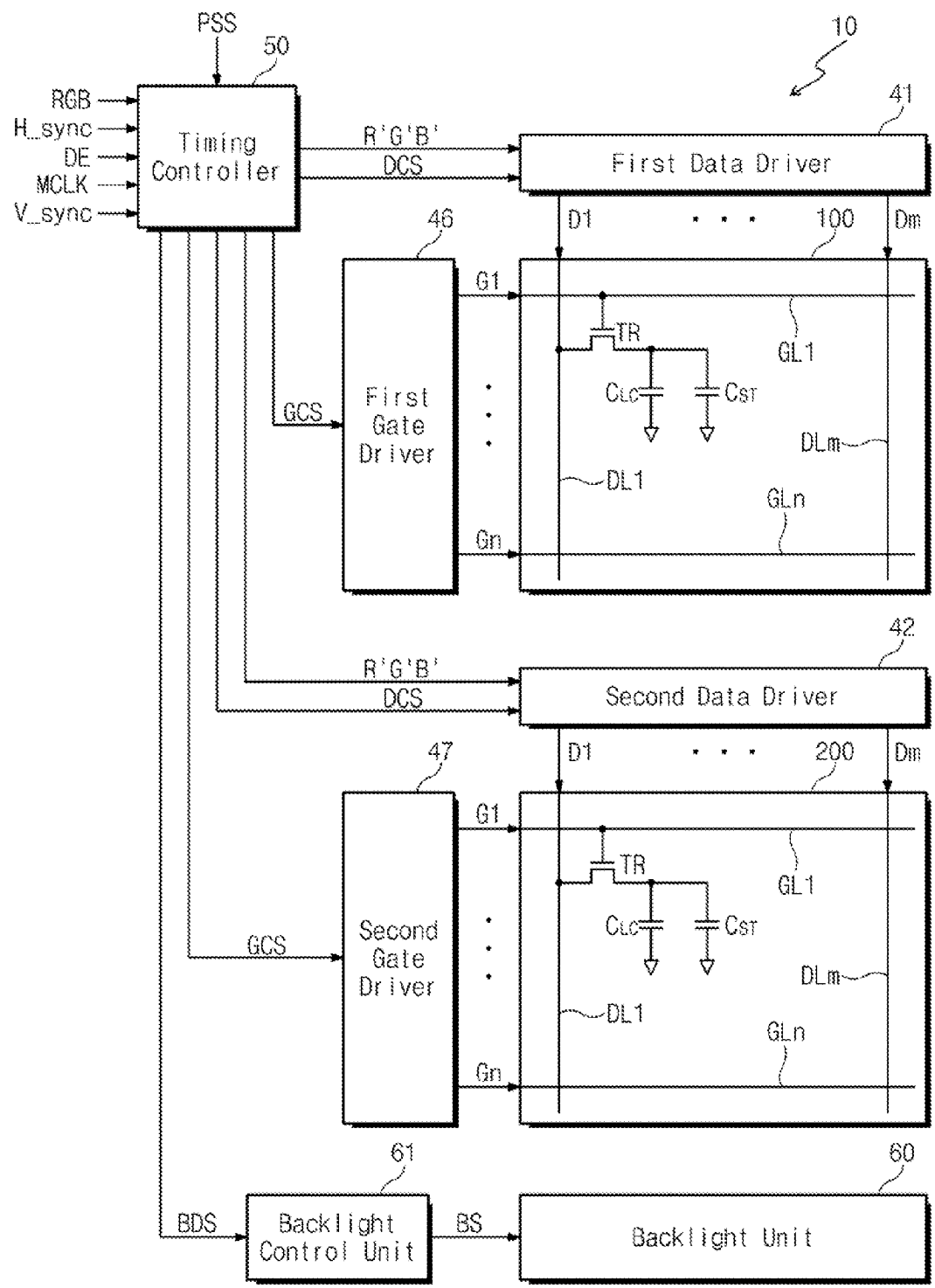
FIG. 1 is a block diagram showing a display apparatus according to an exemplary embodiment of the present invention.

It will be understood that when an element or layer is referred to as being "on", "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Also, spatially relative terms used herein are approximate, and the invention includes other spatial relations besides those stated. In particular, the invention includes all spatial relationships substantially similar to those listed. For example, when two elements are described as parallel or oriented in a particular direction, the invention includes orientations in which these elements are only substantially parallel, or oriented substantially in a particular direction.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in more detail with reference to accompanying drawings.

FIG. 1 is a block diagram showing a display apparatus 10 according to an exemplary embodiment of the present invention.

Referring to FIG. 1, the display apparatus 10 includes a first display panel 100, a first data driver 41, a first gate driver 46, a second display panel 200, a second data driver 42, a second gate driver 47, a timing controller 50, a backlight unit 60, and a backlight control circuit 61.

The first and second display panels 100 and 200 include a plurality of gate lines GL1 to GLn, a plurality of data lines DL1 to DLm crossing the gate lines GL1 to GLn, and a plurality of pixels. Since the pixels each have largely the same structure and function, FIG. 1 shows only one pixel with respect to each of the first and second display panels 100 and 200 as an example for the purpose of explanation. Each pixel includes a thin film transistor TR having gate and source electrodes connected to appropriate gate and data lines, respectively, a liquid crystal capacitor $C_{LC}$ connected to a drain electrode of the thin film transistor TR, and a storage capacitor $C_{ST}$.

The timing controller 50 receives an image signal RGB, a horizontal sync signal H_sync, a vertical sync signal V_sync, a clock signal MCLK, and a data enable signal DE from an external device. In addition, the timing controller 50 receives a panel selecting signal PSS from the external device, selecting one of the first and second display panels 100, 200 for driving. The panel selecting signal PSS may be directly supplied by a user, or may be supplied by a detector (not shown) that detects external light.

In the case that the timing controller 50 receives a panel selecting signal PSS selecting the first display panel 100, the timing controller 50 transmits signals to the first gate and data drivers 41 and 46. In the case that the timing controller 50 receives a panel selecting signal PSS selecting the second display panel 200, the timing controller 50 transmits signals to the second data and gate drivers 42 and 47. In addition, in the case that the timing controller 50 receives a panel selecting signal PSS selecting the second display panel 200, the timing controller 50 transmits a backlight driving signal BDS used to drive the backlight unit 60 to the backlight control circuit 61.

In detail, the timing controller 50 converts the image signal RGB to a format suitable for the first and second data drivers 41 and 42, and outputs a converted image signal R'G'B' to the first data driver 41 or the second data driver 42 according to the panel selecting signal PSS. In addition, the timing controller 50 outputs data control signals DCS (which can include, for example, an output start signal, a horizontal start signal, and/or a clock signal) to the first data driver 41 or the second data driver 42. The timing controller 50 outputs gate control signals GCS (e.g., a vertical start signal, a gate clock signal, and/or an output enable signal) to the first gate driver 46 or the second gate driver 47.

The first and second gate drivers 46 and 47 sequentially apply gate signals G1 to Gn to the gate lines GL1 to GLn of the first and second display panels 100 and 200 in response to the gate control signal GCS, so that the gate lines GL1 to GLn are sequentially scanned.

The first and second data drivers 41 and 42 generate a plurality of grayscale voltages by using gamma voltages supplied from a gamma voltage generator (not shown). The first and second data drivers 41 and 42 select grayscale voltages corresponding to the image signal R'G'B' from the generated grayscale voltages in response to the data control signals DCS, and apply the selected grayscale voltages as data signals D1 to Dm to the data lines DL1 to DLm of the first and second display panels 100 and 200.

When an appropriate gate signal is applied to a gate line selected from the gate lines GL1 to GLn, the thin film transistor TR connected to the selected gate line is turned on. A data signal applied to a data line connected to the thin film transistor TR, which has been turned on, charges the storage capacitor $C_{ST}$ and the liquid crystal capacitor $C_{LC}$ through the thin film transistor TR.

The liquid crystal capacitor $C_{LC}$ adjusts the light transmittance of the liquid crystal (not shown) between the first and second display panels 100 and 200 according to a charged voltage. The storage capacitor $C_{ST}$ stores the data signal when the thin film transistor TR is turned on, and applies the data signal to the liquid crystal capacitor $C_{LC}$ when the thin film transistor TR is turned off, so as to maintain the charge of the liquid crystal capacitor $C_{LC}$. In such a manner, the first and second display panels 100 and 200 can more consistently display an image.

When the backlight control circuit 61 receives the backlight driving signal BDS from the timing controller 50, the backlight control circuit 61 outputs a blocking signal BS to allow a light source of the backlight unit 60 to emit light.

The backlight unit 60 is positioned adjacent to a rear surface or a lateral surface of the second display panel 200, so as to supply light to both the first and second display panels 100 and 200, or just to the second display panel 200.

Although FIG. 1 shows that the first display panel 100 is driven by the first data driver 41 and the first gate driver 46, and the second display panel 200 is driven by the second data driver 42 and the second gate driver 47, embodiments of the invention include configurations in which the first and second display panels 100 and 200 may both be driven by one data driver and one gate driver.

Figure 2:
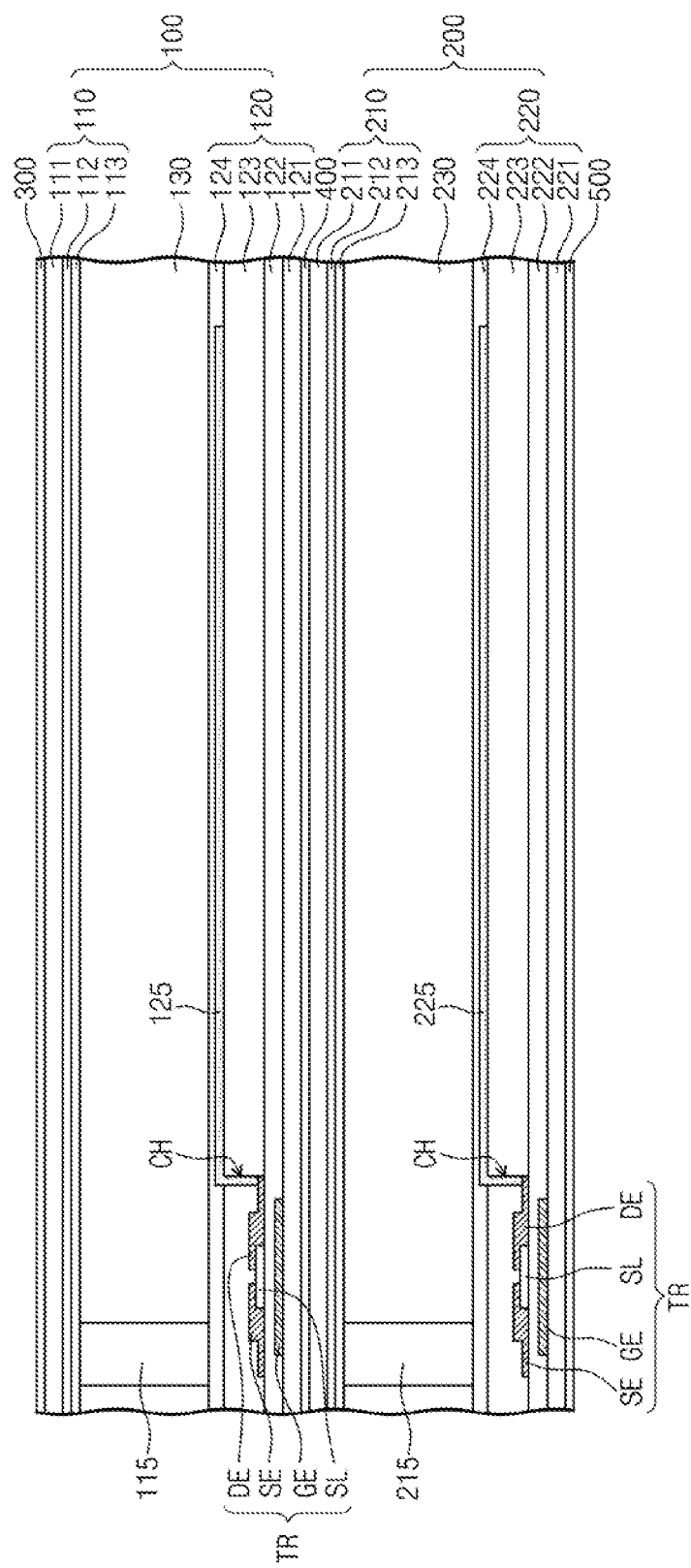
FIG. 2 is a sectional view showing a display panel including first and second display panels of FIG. 1 according to an exemplary embodiment of the present invention.

FIG. 2 is a sectional view showing the display panel including first and second display panels 100 and 200 according to an exemplary embodiment of the present invention.

The display panel includes the first display panel 100, the second display panel 200, a first light absorbing polarizer 300 (i.e., a polarizer that substantially absorbs light oscillating in a direction perpendicular to its transmission axis), a light reflective polarizer 400, and a second light absorbing polarizer 500.

The first display panel 100 includes a first substrate 110, a second substrate 120 facing the first substrate 110, and a first liquid crystal layer 130 interposed between the first and second substrates 110 and 120. The first liquid crystal layer 130 may include any suitable liquid crystal, such as twisted nematic liquid crystal, vertically aligned liquid crystal, cholesteric liquid crystal, or homogeneous aligned liquid crystal.

The first substrate 110 includes a first base substrate 111, a first common electrode 112 provided below the first base substrate 111, and a first alignment layer 113 provided below the first common electrode 112. Although not shown in FIG. 2, the first substrate 110 may include color filters, such as red, green, and blue color filters.

The second substrate 120 includes a second base substrate 121, the thin film transistor TR, and a first pixel electrode 125.

The thin film transistor TR includes a gate electrode GE, a source electrode SE, and a drain electrode DE. The gate electrode GE branches from the gate line GL, and is provided on the second base substrate 121. A first gate insulating layer 122 is provided on both of the second base substrate 121 and the gate electrode GE. The source electrode SE branches from the data line DL and is provided on the first gate insulating layer 122. The drain electrode DE is provided on the first gate insulating layer 122 while being spaced apart from the source electrode SE. A semiconductor layer SL is provided between each of the gate electrode GE and the source and drain electrodes SE and DE. In addition, a first organic protective layer 123 is provided on the thin film transistor TR.

A first pixel electrode 125 is provided on the first organic protective layer 123, and connected to the drain electrode DE through a contact hole CH. The first pixel electrode 125 forms an electric field with the first common electrode 112, thereby adjusting the alignment of the intervening liquid crystal.

A second alignment layer 124 is provided on the first organic protective layer 123 and the first pixel electrode 125, to align the liquid crystal of the first liquid crystal layer 130. A first column spacer 115 is interposed between the first and second substrates 110 and 120 to maintain the gap between the first and second substrates 110 and 120 at a substantially uniform distance.

The second display panel 200 includes a third substrate 210, a fourth substrate 220 facing the third substrate 210, and a second liquid crystal layer 230 interposed between the third and fourth substrates 210 and 220. The second liquid crystal layer 230 may include any suitable liquid crystal, such as twisted nematic liquid crystal, vertically aligned liquid crystal, cholesteric liquid crystal, or homogeneous aligned liquid crystal.

The third substrate 210 includes a third base substrate 211, a second common electrode 212 provided below the third base substrate 211, and a third alignment layer 213 provided below the second common electrode 212. Although not shown in figures, the third substrate 210 may include color filters such as red, green, and blue color filters.

The fourth substrate 220 includes a fourth base substrate 221, the thin film transistor TR, and a second pixel electrode 225.

The thin film transistor TR of fourth substrate 220 includes a gate electrode GE, source electrode SE, and drain electrode DE. The gate electrode GE branches from the gate line GL, and is provided on the fourth base substrate 221. A second gate insulating layer 222 is provided on both of the fourth base substrate 221 and the gate electrode GE. The source electrode SE branches from the data line DL and is provided on the second gate insulating layer 222. The drain electrode DE is provided on the second gate insulating layer 222 while being spaced apart from the source electrode SE. The semiconductor layer SL is provided between each of the gate electrode GE and the source and drain electrodes SE and DE. In addition, the thin film transistor TR is provided with a second organic protective layer 223 thereon.

A second pixel electrode 225 is provided on the second organic protective layer 223, and is connected to the drain electrode DE through the contact hole CH. The second pixel electrode 225 forms an electric field with the second common electrode 212, thereby adjusting the alignment of liquid crystal contained in the second liquid crystal layer 230.

A fourth alignment layer 224 is provided on the second organic protective layer 223 and the second pixel electrode 225, to align the liquid crystal of the second liquid crystal layer 230. A second column spacer 215 is interposed between the first and second substrates 210 and 220, to maintain the gap between the third and fourth substrates 210 and 220 at a substantially uniform distance.

Although FIG. 2 shows that the first and second display panels 100 and 200 have substantially the same structure, the first and second display panels 100 and 200 may have different structures in other embodiments.

The light reflective polarizer 400 is interposed between the first and second display panels 100 and 200, to reflect light oscillating in one direction and to transmit light oscillating in other directions substantially perpendicular to the one direction. To accomplish this, the light reflective polarizer 400 may include, for example, a wire grid polarizer or a multilayer polarizer.

The first light absorbing polarizer 300 is provided on the first display panel 100, and the second light absorbing polarizer 500 is provided below the second display panel 200. The first and second light absorbing polarizers 300 and 500 absorb light oscillating in one direction, and transmit light oscillating in other directions substantially perpendicular to the one direction.

FIGS. 3A to 3D are views showing the display panel of FIG. 2 and its operation according to an exemplary embodiment of the present invention. Elements serving as actual optical components are shown in FIGS. 3A to 3D.

Referring to FIGS. 3A to 3D, the first and second liquid crystal layers 130 and 230 include vertically aligned liquid crystal. When no electric field is applied to the first and second liquid crystal layers 130 and 230, the vertically aligned liquid crystal may be aligned substantially perpendicularly to the first and second liquid crystal layers 130 and 230. When an electric field is applied to the first and second liquid crystal layers 130 and 230, the vertically aligned liquid crystal may be aligned substantially horizontally with respect to the first and second liquid crystal layers 130 and 230.

The first light absorbing polarizer 300 has a transmission axis TA in which light oscillating in parallel to a first direction D1 is transmitted, and an absorption axis in which light oscillating in parallel to a second direction D2 substantially perpendicular to the first direction D1 is absorbed. The first alignment layer 113 is aligned at an angle of about 45 degrees with respect to the first and second directions D1 and D2, that is, aligned in a third direction D3. The second alignment layer 124 is aligned in a direction opposite to the third direction D3 while being parallel to a rubbing direction RD of the first alignment layer 113.

The light reflective polarizer 400 has a transmission axis TA in which light oscillating in parallel to the first direction D1 is transmitted, and a reflective axis RA in which light oscillating in parallel to the second direction D2 is reflected. The third alignment layer 213 is aligned at an angle of about 45 degrees with respect to the first and second directions D1 and D2, and the fourth alignment layer 224 is aligned in a direction opposite to the third direction D3 while being parallel to the rubbing direction RD of the third alignment layer 213. The second light absorbing polarizer 500 has a transmission axis TA in which light oscillating in parallel to the second direction D2 is transmitted, and an absorption axis in which light oscillating in parallel to the first direction D1 is absorbed.

The transmission axes TA of the first and second light absorbing polarizers 300 and 500 and the light reflective polarizer 400, as well as the rubbing directions RD of the first to fourth alignment layers 113, 124, 213, and 224 may vary in differing embodiments.

FIGS. 3A to 3D show the transmission axes TA and the reflective axes RA of the first and second light absorbing polarizers 300 and 500 and the light reflective polarizer 400. Further, in FIGS. 3A to 3D, the light oscillating in the first direction D1 is marked as "↔", and the light oscillating in the second direction D2 is marked as "↕".

Figure 3A:
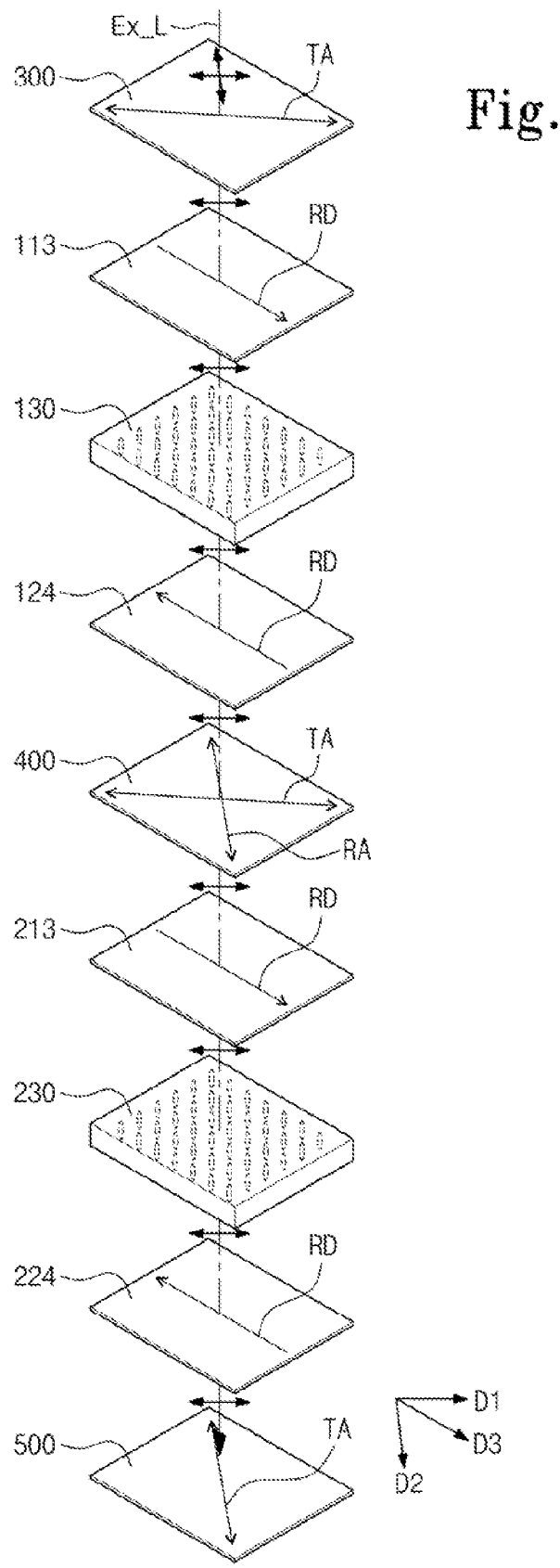
FIGS. 3A to 3D are views showing the display panel of FIG. 2 and the operating principle thereof according to an exemplary embodiment of the present invention.
Figure 3B:
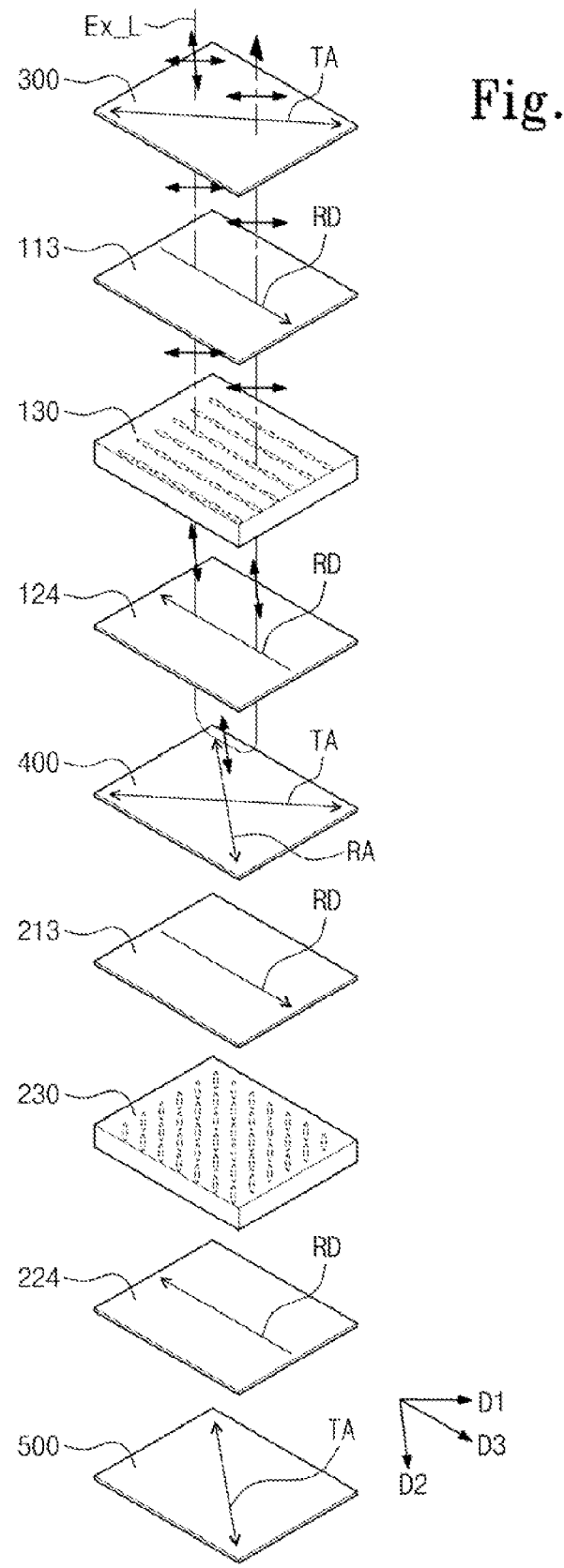

FIGS. 3A and 3B show a method of displaying an image by using external light Ex_L, that is, a method of displaying the image in a reflective mode.

Referring to FIG. 3A, external light Ex_L is incident, and oscillates in the first and second directions D1 and D2. Only light oscillating in the first direction D1 passes through the first light absorbing polarizer 300, and light oscillating in the second direction D2 is absorbed. When no electric field is applied to the first liquid crystal layer 130, the light, which has passed through the first light absorbing polarizer 300, passes through the first liquid crystal layer 130 without phase change. Since light that has passed through the first liquid crystal layer 130 oscillates in parallel to the transmission axis of the light reflective polarizer 400, the light passes through the light reflective polarizer 400. When no electric field is applied to the second liquid crystal layer 230, the light, which has passed through the light reflective polarizer 400, passes through the second liquid crystal layer 230 without phase change. Since light that has passed through the second liquid crystal layer 230 oscillates in parallel to the absorption axis of the second light absorbing polarizer 500, the light is absorbed by the second light absorbing polarizer 500. Therefore, when no electric field is applied to the first and second liquid crystal layers 130 and 230, the external light Ex_L is not reflected back out of the display panel. Accordingly, the display panel can represent a black grayscale.

Referring to FIG. 3B, external light Ex_L is incident while oscillating in the first and second directions D1 and D2. Only light oscillating in the first direction D1 passes through the first light absorbing polarizer 300, and light oscillating in the second direction D2 is absorbed. When an electric field is applied to the first liquid crystal layer 130, the liquid crystal of the first liquid crystal layer 130 is aligned substantially parallel to the rubbing direction RD, and the phase of light that passes through the first absorbing polarizer 300 is changed to 90 degrees when it passes through the first liquid crystal layer 130. Accordingly, since light that has passed through the first liquid crystal layer 130 oscillates in parallel to the reflective axis RA of the light reflective polarizer 400, the light is reflected by the light reflective polarizer 400. The phase of light reflected by the light reflective polarizer 400 is changed by 90 degrees when the light passes through the first liquid crystal layer 130 again. Therefore, the reflected light, which has passed through the first liquid crystal layer 130, oscillates in parallel to the transmission axis TA of the first light absorbing polarizer 300. It thus passes through the first light absorbing polarizer 300. Therefore, when an electric field is applied to the first liquid crystal layer 130, external light Ex_L is reflected back out of the display panel. Accordingly, the display panel can represent a white grayscale. It can also be seen that the intensity of the electric field applied to the first liquid crystal layer 130 can be adjusted so that a plurality of grayscales can be represented.

Accordingly, in the reflective mode, the signal applied to the first display panel 100 can be adjusted, thereby displaying an image.

Figure 3C:
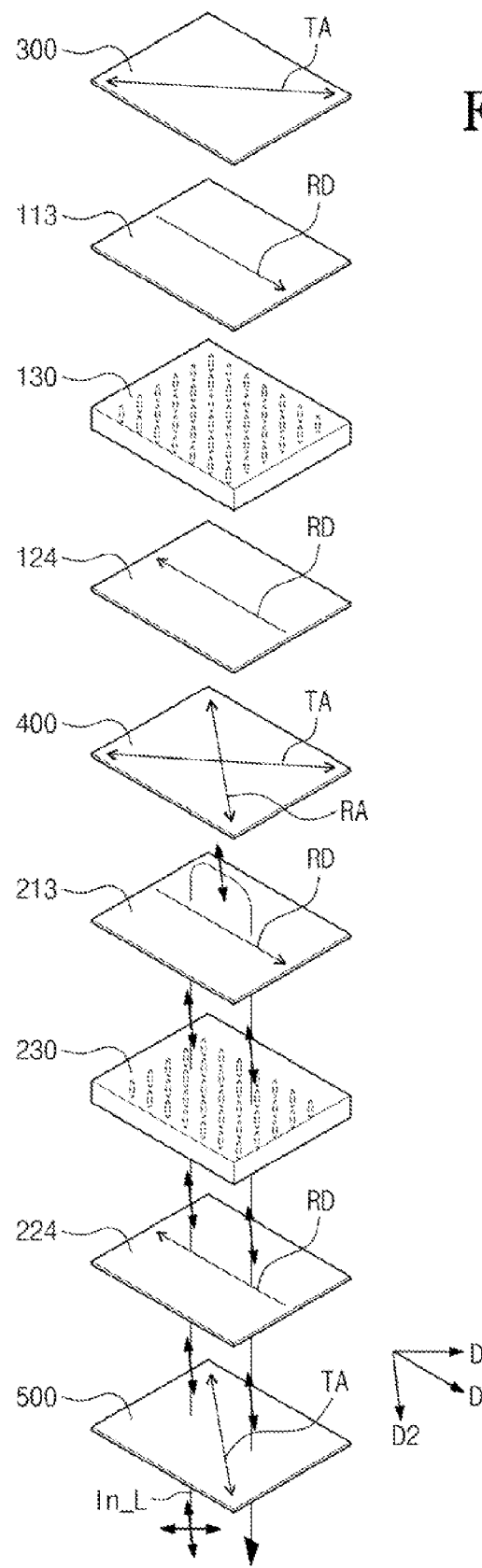
Figure 3D:
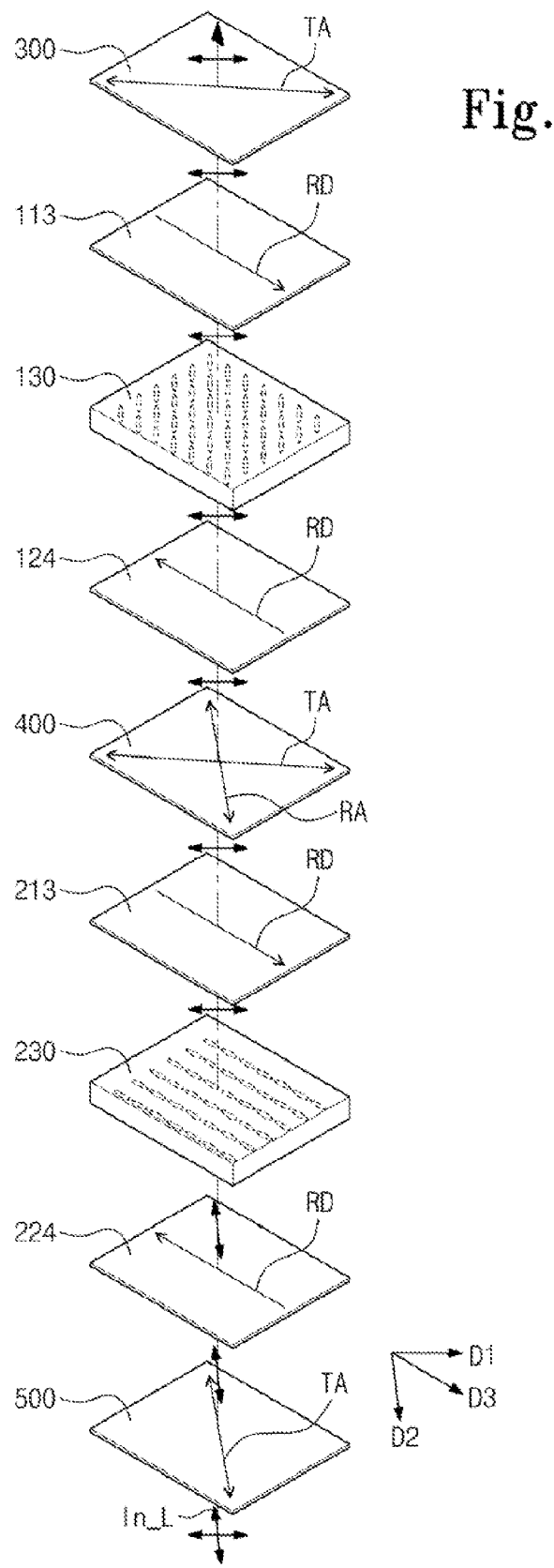

FIGS. 3C and 3D show a method in which the display panel displays an image by using a light In_L emitted from the backlight unit 60, that is, a method in which the display panel displays the image in a transmissive mode.

Referring to FIG. 3C, light In_L incident from the backlight unit 60 oscillates in the first and second directions D1 and D2, but only light oscillating in the second direction D2 passes through the second light absorbing polarizer 500. Light oscillating in the first direction D1 is absorbed by the second light absorbing polarizer 500. When no electric field is applied to the second liquid crystal layer 230, the light, which has been transmitted through the second light absorbing polarizer 500, passes through the second liquid crystal layer 230 without phase change. Since light that has passed through the second liquid crystal layer 230 oscillates in parallel to a reflective axis RA of the light reflective polarizer 400, the light is reflected by the light reflective polarizer 400. Accordingly, when no electric field is applied to the second liquid crystal layer 230, the light In_L incident from the backlight unit 60 is not transmitted out of the display panel. Accordingly, the display panel can represent a black grayscale.

Referring to FIG. 3D, when an electric field is applied to the second liquid crystal layer 230, the liquid crystal of the second liquid crystal layer 230 is aligned in parallel to the rubbing direction RD, and the phase of light that has been transmitted through the second light absorbing polarizer 500 is changed by 90 degrees when the light passes through the second liquid crystal layer 230. Therefore, since light that has passed through the second liquid crystal layer 230 oscillates in parallel to the transmission axis TA of the light reflective polarizer 400, the light is transmitted through the light reflective polarizer 400. When no electric field is applied to the first liquid crystal layer 130, light that has been transmitted through the light reflective polarizer 400 passes through the first liquid crystal layer 130 without phase change. The light that has passed through the first liquid crystal layer 130 oscillates in parallel to the transmission axis TA of the first light absorbing polarizer 300, so that the light is transmitted through the first light absorbing polarizer 300. Therefore, when an electric field is applied to the second liquid crystal layer 230, light incident from the backlight unit 60 is transmitted out of the display panel, and the display panel can display a white grayscale. In addition, the display panel can adjust the intensity of the electric field applied to the second liquid crystal layer 230 so as to generate a plurality of grayscales.

Therefore, in the transmissive mode, the signal applied to the second display panel 200 can be adjusted, thereby displaying an image.

Figure 4A:
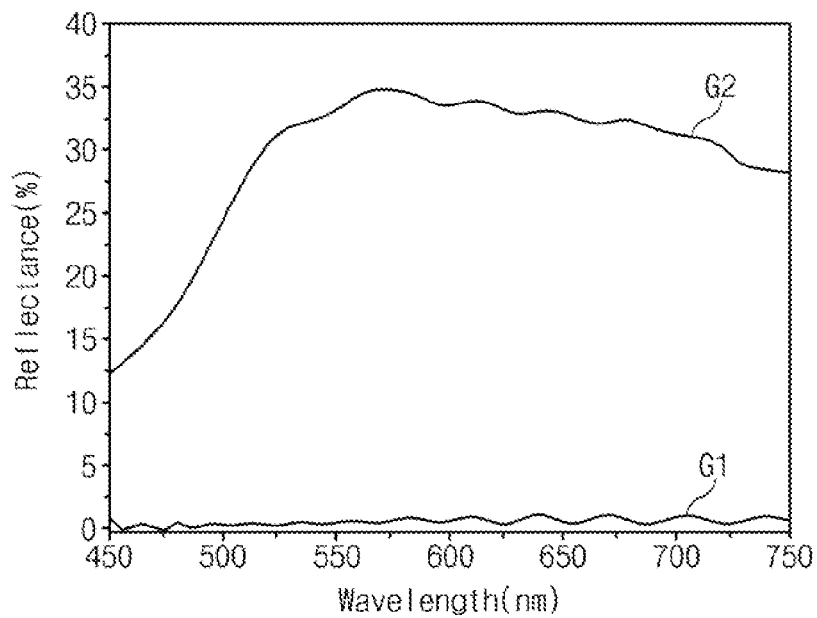
FIG. 4A is a graph showing the spectral characteristic of the display panel of FIGS. 3A and 3B operating in a reflective mode.
Figure 4B:
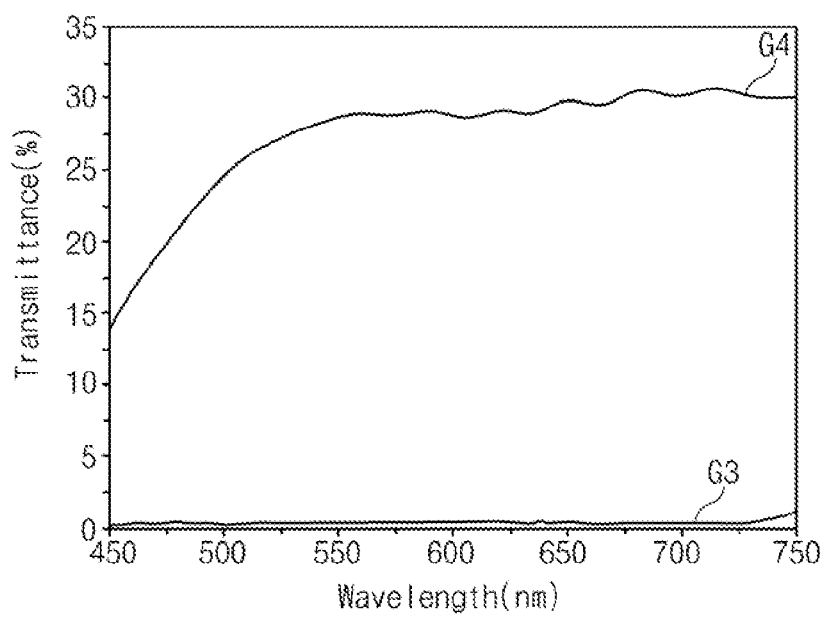
FIG. 4B is a graph showing the spectral characteristic of the display panel of FIGS. 3C and 3D operating in a transmissive mode.

FIG. 4A is a graph representing the spectral characteristic of the display panel of FIGS. 3A and 3B operating in reflective mode, and FIG. 4B is a graph representing the spectral characteristic of the display panel of FIGS. 3C and 3D operating in transmissive mode. In FIGS. 4A and 4B, the liquid crystal of the first and second liquid crystal layers 130 and 230 is vertically aligned.

Referring to FIG. 4A, first curve G1 represents the reflectance of the display panel when the display panel is driven so as to generate a black grayscale, and second curve G2 represents the reflectance of the display panel when the display panel is driven so as to generate a white grayscale.

Referring to FIG. 4B, a third curve G3 represents the transmittance of the display panel when the display panel is driven so as to generate a black grayscale, and a fourth curve G4 represents the transmittance of the display panel when the display panel is driven so as to generate a white grayscale.

Referring to FIGS. 4A and 4B, it can be seen that there is a significant difference in reflectance and transmittance between the black grayscale and the white grayscale. Therefore, in the reflective mode, sufficient contrast between the two colors exists for the first display panel 100 to display an image. The same holds true for the second display panel 200 in transmissive mode.

FIGS. 5A to 5D are views showing the display panel of FIG. 2 and its operation according to another exemplary embodiment of the present invention, and elements serving as actual optical components are shown in FIGS. 5A to 5D.

Referring to FIGS. 5A to 5D, the first and second liquid crystal layers 130 and 230 include twisted nematic liquid crystal. When no electric field is applied to the first and second liquid crystal layers 130 and 230, the twisted nematic liquid crystal is twisted in a direction substantially parallel to the first and second liquid crystal layers 130 and 230. When an electric field is applied to the first and second liquid crystal layers 130 and 230, the twisted nematic liquid crystal is aligned substantially perpendicularly to the first and second liquid crystal layers 130 and 230.

The first light absorbing polarizer 300 has an absorption axis in which light oscillating in parallel to the first direction D1 is absorbed, and the transmission axis TA in which light oscillating in parallel to the second direction D2 substantially perpendicular to the first direction D1 is transmitted. The first alignment layer 113 is aligned in the second direction D2, and the second alignment layer 124 is aligned in a direction opposite to the first direction D1 while being perpendicular to the rubbing direction RD of the first alignment layer 113.

The light reflective polarizer 400 has a transmission axis TA in which the light oscillating in parallel to the first direction D1 is transmitted, and a reflective axis RA in which light oscillating in parallel to the second direction D2 is reflected. The third alignment layer 213 is aligned in the second direction D2, and the fourth alignment layer 224 is aligned in a direction opposite to the first direction D1 while being perpendicular to the rubbing direction RD of the third alignment layer 213. The second light absorbing polarizer 500 has a transmission axis TA in which light oscillating in parallel to the first direction D1 is transmitted, and an absorption axis in which light oscillating in parallel to the second direction D2 is absorbed.

FIGS. 5A to 5D show only the transmission axes TA of the first and second light absorbing polarizers 300 and 500 and the light reflective polarizer 400. Further, in FIGS. 5A to 5D, the light oscillating in the first direction D1 is marked roughly as "↔", and the light oscillating in the second direction D2 is marked roughly as "↕".

Figure 5A:
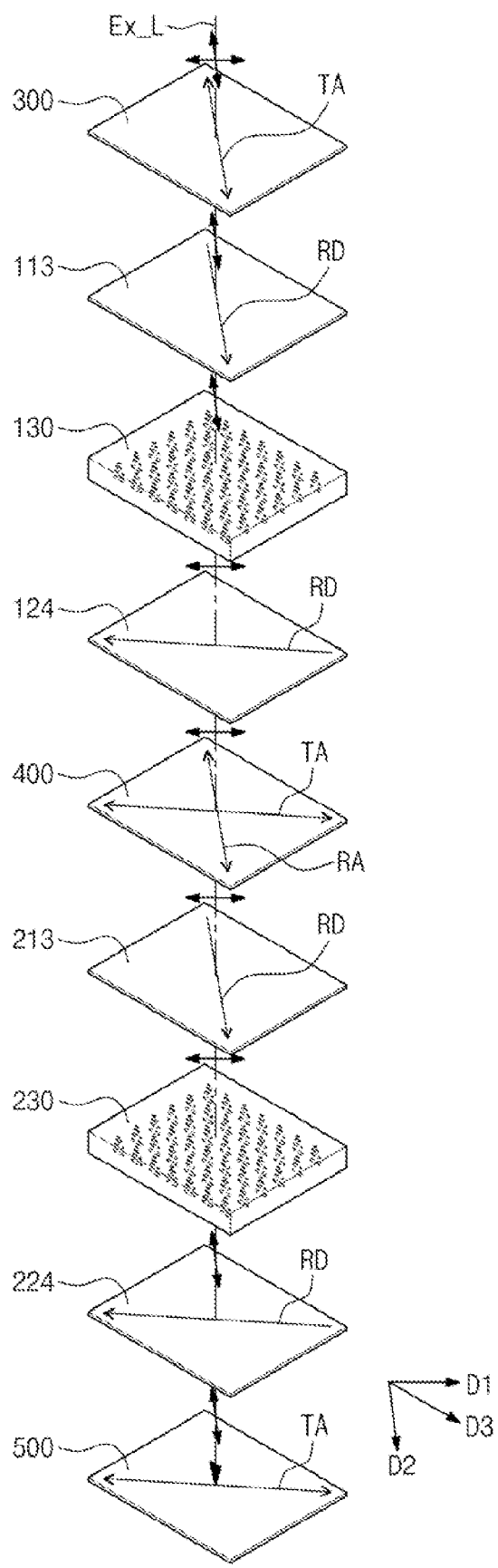
FIGS. 5A to 5D are views showing the display panel of FIG. 2 and the operating principle thereof according to another exemplary embodiment of the present invention.
Figure 5B:
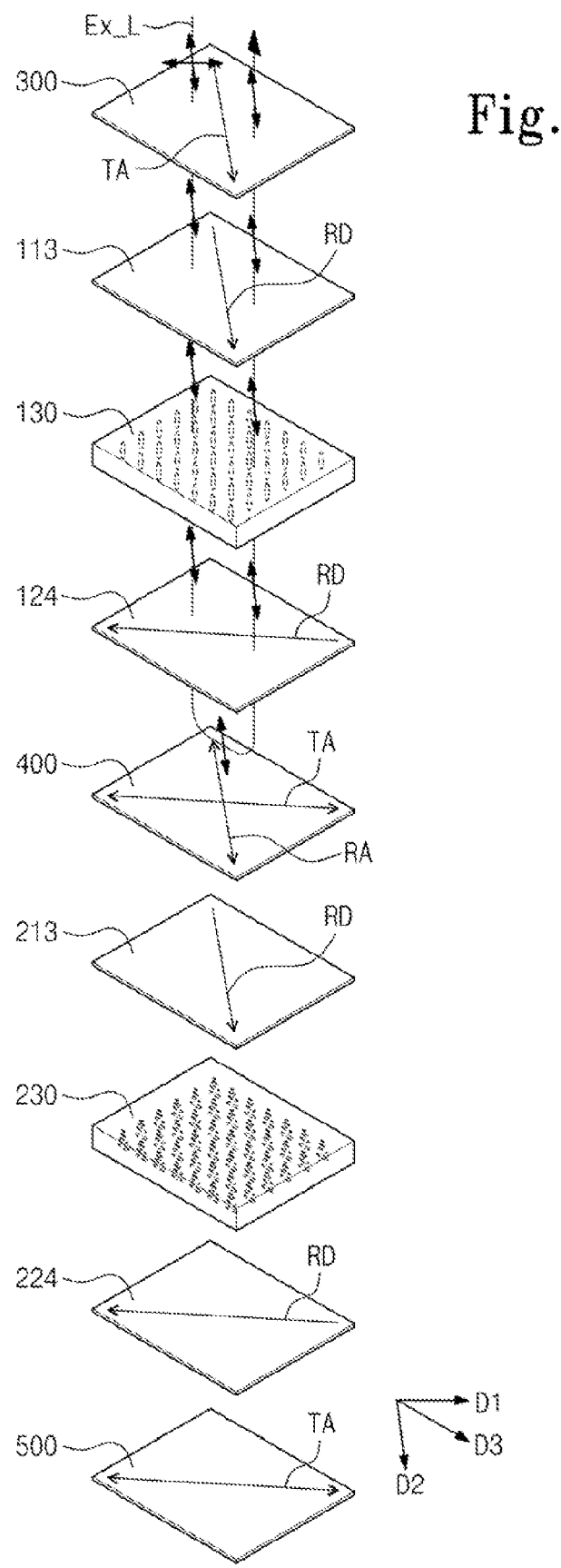

FIGS. 5A and 5B show a method in which the display panel displays an image by using external light Ex_L, that is, a method in which the display panel displays the image in reflective mode.

Referring to FIG. 5A, external light Ex_L oscillates in the first and second directions D1 and D2, but only light oscillating in the second direction D2 passes through the first light absorbing polarizer 300, and light oscillating in the first direction D1 is absorbed. When no electric field is applied to the first liquid crystal layer 130, the phase of light that has passed through the first light absorbing polarizer 300 is changed by 90 degrees. Since light that has passed through the first liquid crystal layer 130 oscillates in parallel to the transmission axis TA of the light reflective polarizer 400, the light passes through the light reflective polarizer 400. When no electric field is applied to the second liquid crystal layer 230, the phase of light that has passed through the light reflective polarizer 400 is changed by 90 degrees. Since light that has passed through the second liquid crystal layer 230 oscillates in parallel to the absorption axis of the second light absorbing polarizer 500, the light is absorbed by the second light absorbing polarizer 500. Therefore, when no electric field is applied to the first and second liquid crystal layers 130 and 230, the external light Ex_L is not reflected back out of the display panel. Accordingly, the display panel can represent a black grayscale.

Referring to FIG. 5B, when external light Ex_L is incident while oscillating in the first and second directions D1 and D2, only light oscillating in the second direction D2 passes through the first light absorbing polarizer 300. Light oscillating in the first direction D1 is absorbed by the first light absorbing polarizer 300. When an electric field is applied to the first liquid crystal layer 130, the liquid crystal of the first liquid crystal layer 130 is aligned perpendicular to the first liquid crystal layer 130. Light which has passed through the first absorbing polarizer 300 thus passes through the first liquid crystal layer 130 without phase change, and oscillates in parallel to the reflective axis RA of the light reflective polarizer 400. This light is thus reflected by the light reflective polarizer 400. The phase of the reflected light is not changed when it passes back through the first liquid crystal layer 130. Therefore, the reflected light oscillates in parallel to the transmission axis TA of the first light absorbing polarizer 300 as it is transmitted through the first light absorbing polarizer 300. Therefore, when an electric field is applied to the first liquid crystal layer 130, the external light Ex_L is reflected back out of the display panel. Accordingly, the display panel can represent a white grayscale, as well as adjust the intensity of an electric field applied to the first liquid crystal layer 130, so that a plurality of grayscales can be represented.

Accordingly, in the reflective mode, the signal applied to the first display panel 100 can be adjusted so as to display an image.

Figure 5C:
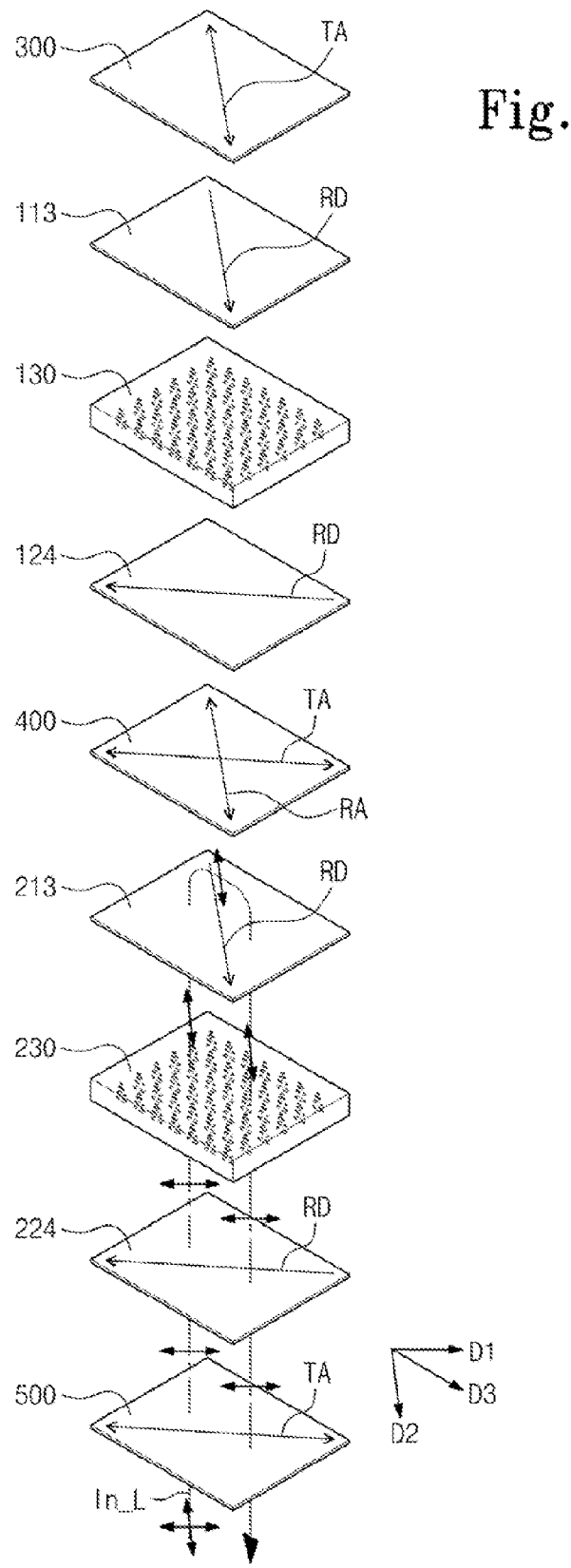
Figure 5D:
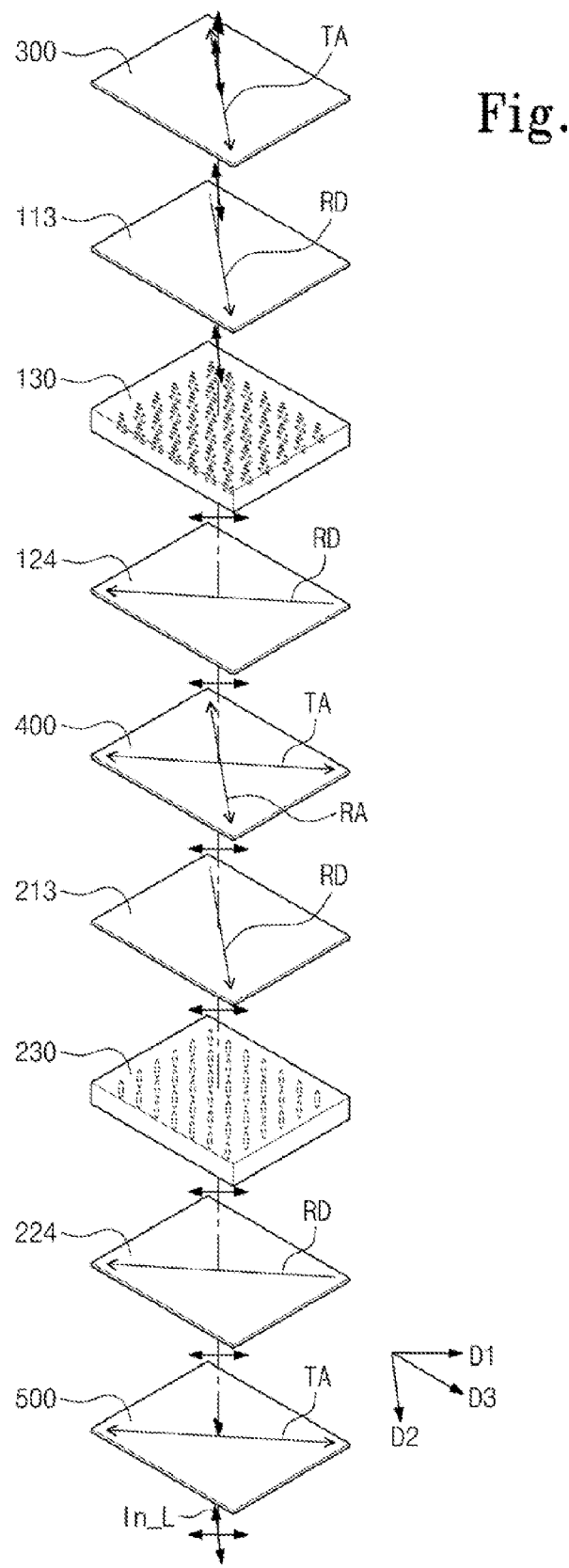

FIGS. 5C and 5D show a method in which the display panel displays an image by using a light In_L emitted from the backlight unit 60, that is, a method in which the display panel displays the image in a transmissive mode.

Referring to FIG. 5C, light In_L is incident from the backlight unit 60 while oscillating in the first and second directions D1 and D2. Only light oscillating in the first direction D1 passes through the second light absorbing polarizer 500, and light oscillating in the second direction D2 is absorbed. When no electric field is applied to the second liquid crystal layer 230, the phase of light transmitted through the second light absorbing polarizer 500 is changed by 90 degrees when the light passes through the second liquid crystal layer 230. Since light which has passed through the second liquid crystal layer 230 oscillates in parallel to the reflective axis RA of the light reflective polarizer 400, the light is reflected by the light reflective polarizer 400. Accordingly, when no electric field is applied to the second liquid crystal layer 230, light In_L is not transmitted out of the display panel. Accordingly, the display panel can represent a black grayscale.

Referring to FIG. 5D, light In_L is incident from the backlight unit 60 while oscillating in the first and second directions D1 and D2, but only light oscillating in the first direction D1 passes through the second light absorbing polarizer 500. Light oscillating in the second direction D2 is absorbed by the second light absorbing polarizer 500. When an electric field is applied to the second liquid crystal layer 230, the liquid crystal of the second liquid crystal layer 230 is aligned perpendicular to the second liquid crystal layer 230, and the phase of light is not changed when it passes through the second liquid crystal layer 230. Therefore, since the light that has passed through the second liquid crystal layer 230 oscillates in parallel to the transmission axis TA of the light reflective polarizer 400, the light is transmitted through the light reflective polarizer 400. When no electric field is applied to the first liquid crystal layer 130, the phase of light that has been transmitted through the light reflective polarizer 400 is changed by 90 degrees when the light passes through the first liquid crystal layer 130. The light that has passed through the first liquid crystal layer 130 oscillates in parallel to the transmission axis TA of the first light absorbing polarizer 300, so that the light is transmitted through the first light absorbing polarizer 300. Therefore, when an electric field is applied to the second liquid crystal layer 230, light incident from the backlight unit 60 is transmitted out of the display panel, allowing the display panel to represent a white grayscale. In addition, the display panel can adjust the intensity of the electric field applied to the second liquid crystal layer 230 to represent a plurality of grayscales.

Therefore, in the transmissive mode, the signal applied to the second display panel 200 can be adjusted so as to display an image.

Figure 6A:
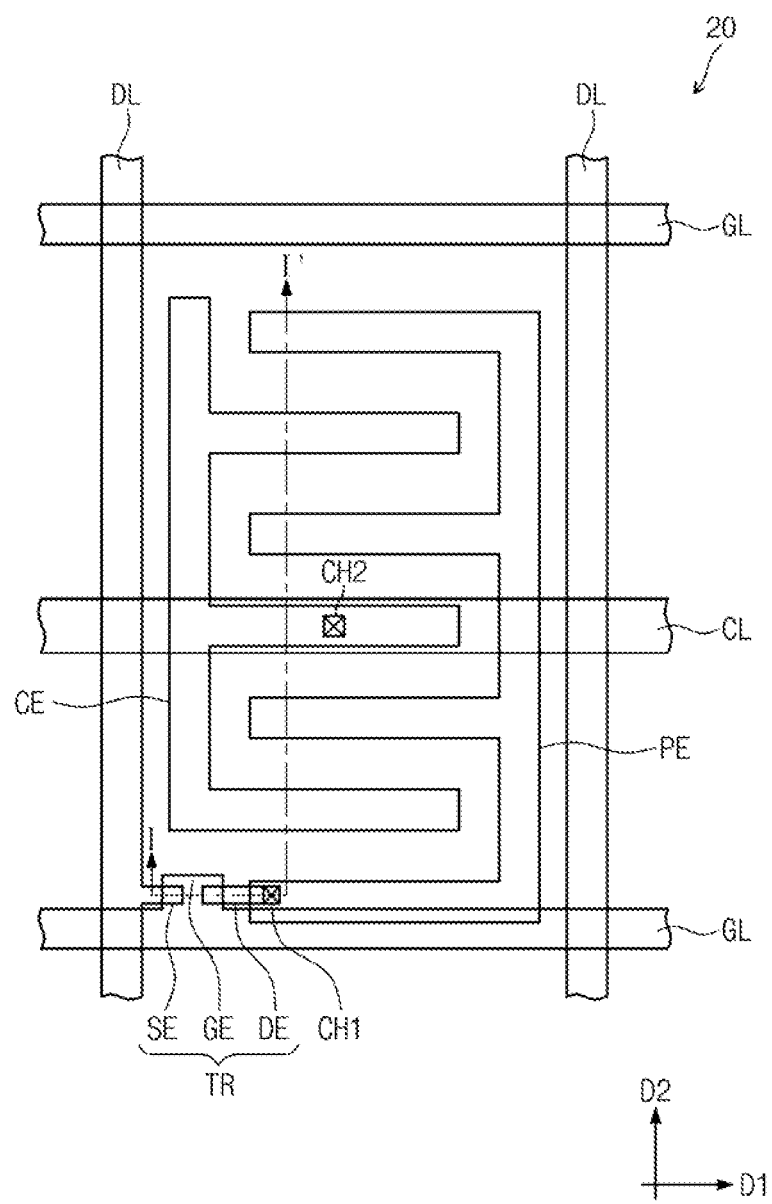
FIG. 6A is a plan view showing a display panel including the first and second display panels of FIG. 1 according to another exemplary embodiment of the present invention.
Figure 6B:
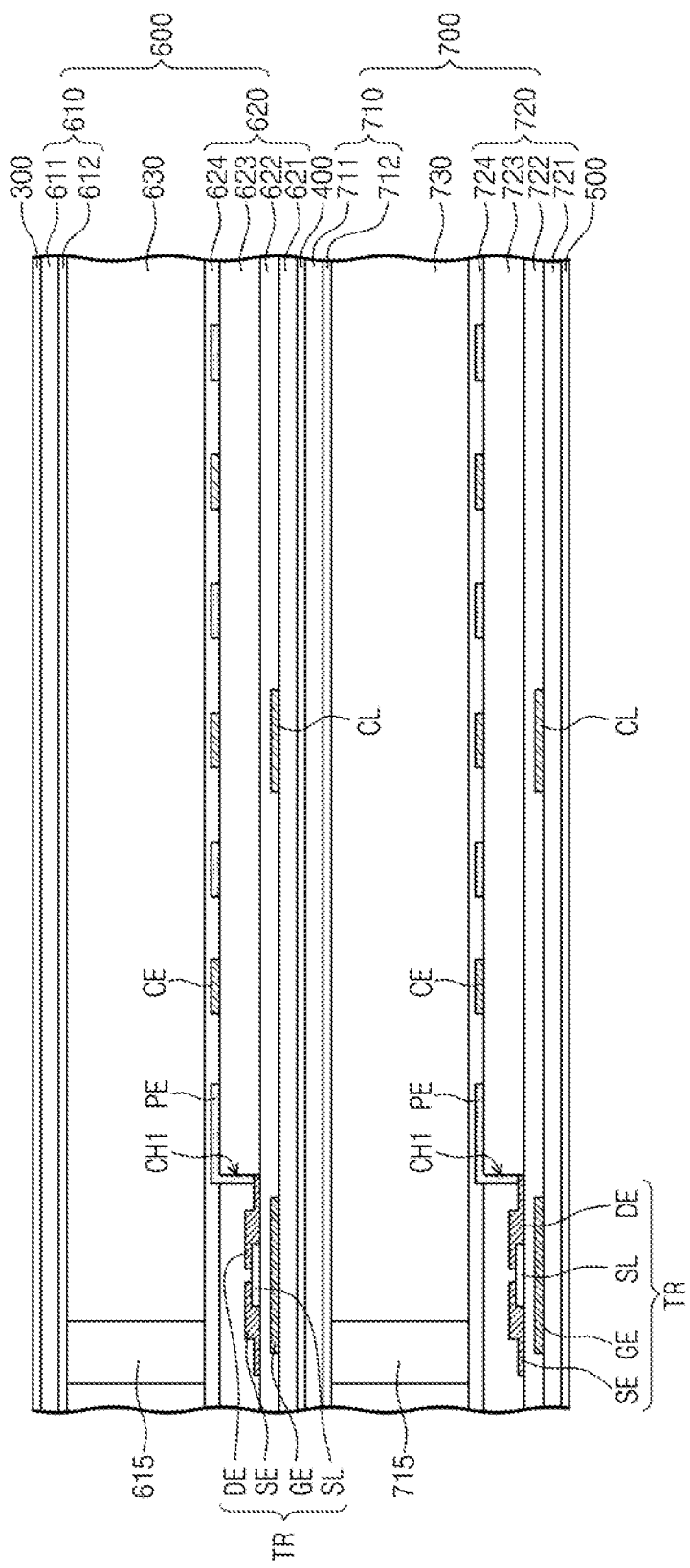
FIG. 6B is a sectional view showing the display panel taken along line I-I' of FIG. 6A.

FIG. 6A is a plan view showing a display panel including the first and second display panels of FIG. 1 according to another exemplary embodiment of the present invention. FIG. 6B is a sectional view showing the display panel taken along line I-I' of FIG. 6A.

Referring to FIG. 6A, the display panel includes the gate line GL extending in the first direction D1, the data line DL extending in the second direction D2 while crossing the gate line GL, a common line CL extending in the first direction D1 while being spaced apart from the gate line GL, a thin film transistor TR connected to the gate line GL, a pixel electrode PE, and a common electrode CE.

The thin film transistor TR includes gate electrode GE branching from the gate line GL, source electrode SE branching from the data line DL while being insulated from the gate electrode GE, and drain electrode DE spaced apart from the source electrode SE by a predetermined distance.

The pixel electrode PE is connected to the drain electrode DE through a first contact hole CH1 and the common electrode CE is connected to the common line CL through a first contact hole CH2.

Referring to FIG. 6B, the display panel includes a first display panel 600, a second display panel 700, the first light absorbing polarizer 300, the light reflective polarizer 400, and the second light absorbing polarizer 500. In the following description, the same reference numbers will be designated to components that are substantially the same as those of FIG. 2, and these components and structures will largely not be further described, in order to avoid redundancy.

The first display panel 600 includes a first substrate 610, a second substrate 620 facing the first substrate 610, and a first liquid crystal layer 630 interposed between the first and second substrates 610 and 620. The first liquid crystal layer 630 may include liquid crystal such as homogeneous aligned liquid crystal used in a lateral electric field scheme.

The first substrate 610 includes a first base substrate 611 and a first alignment layer 612 provided below the first base substrate 611. Although not shown in FIG. 6B, the first substrate 610 may include red, green, and blue color filters.

The second substrate 620 includes a second base substrate 621, a first gate insulating layer 622 provided on the gate electrode GE and the common line CL, and source and drain electrodes SE and DE provided on the first gate insulating layer 622. The semiconductor layer SL is interposed between the gate electrode GE and the source and drain electrodes SE and DE. In addition, a first organic protective layer 623 is provided on the thin film transistor TR.

The pixel electrode PE and the common electrode CE are provided on the first organic protective layer 623, so that a lateral electric field is formed between the pixel electrode PE and the common electrode CE.

A second alignment layer 624 is provided on the first organic protective layer 623, the pixel electrode PE, and the common electrode CE, to align the liquid crystal of the first liquid crystal layer 630. The rubbing direction of the first and second alignment layers 612 and 624 may be set at a predetermined angle about the pixel electrode PE and the common electrode CE.

A first column spacer 615 is interposed between the first and second substrates 610 and 620, to maintain the gap between the first and second substrates 610 and 620 at a predetermined distance.

The second display panel 700 includes a third substrate 710, a fourth substrate 720 facing the third substrate 710, and a second liquid crystal layer 730 interposed between the third and fourth substrates 710 and 720. The second liquid crystal layer 730 may include liquid crystal such as homogeneous aligned liquid crystal used in a lateral electric field scheme.

The third substrate 710 includes a third base substrate 711 and a third alignment layer 712 provided below the third base substrate 711. Although not shown in figures, the third substrate 710 may include color filters such as red, green, and blue color filters.

The second substrate 720 includes a fourth base substrate 721, a second gate insulating layer 722 provided on the gate electrode GE and the common line CL, and source and drain electrodes SE and DE provided on the second gate insulating layer 722. The semiconductor layer SL is interposed between the gate electrode GE and the source and drain electrodes SE and DE. In addition, a second organic protective layer 723 is provided on the thin film transistor TR.

The pixel electrode PE and the common electrode CE are provided on the second organic protective layer 723, and a horizontal electric field is formed between the pixel electrode PE and the common electrode CE.

A fourth alignment layer 724 is provided on the second organic protective layer 723, the pixel electrode PE, and the common electrode CE to align the liquid crystal of the second liquid crystal layer 730. The rubbing direction of the third and fourth alignment layers 712 and 724 may be set at a predetermined angle about the pixel electrode PE and the common electrode CE.

A second column spacer 715 is interposed between the third and fourth substrates 710 and 720, to maintain the gap between the third and fourth substrates 710 and 720 at a predetermined distance.

Figure 7:
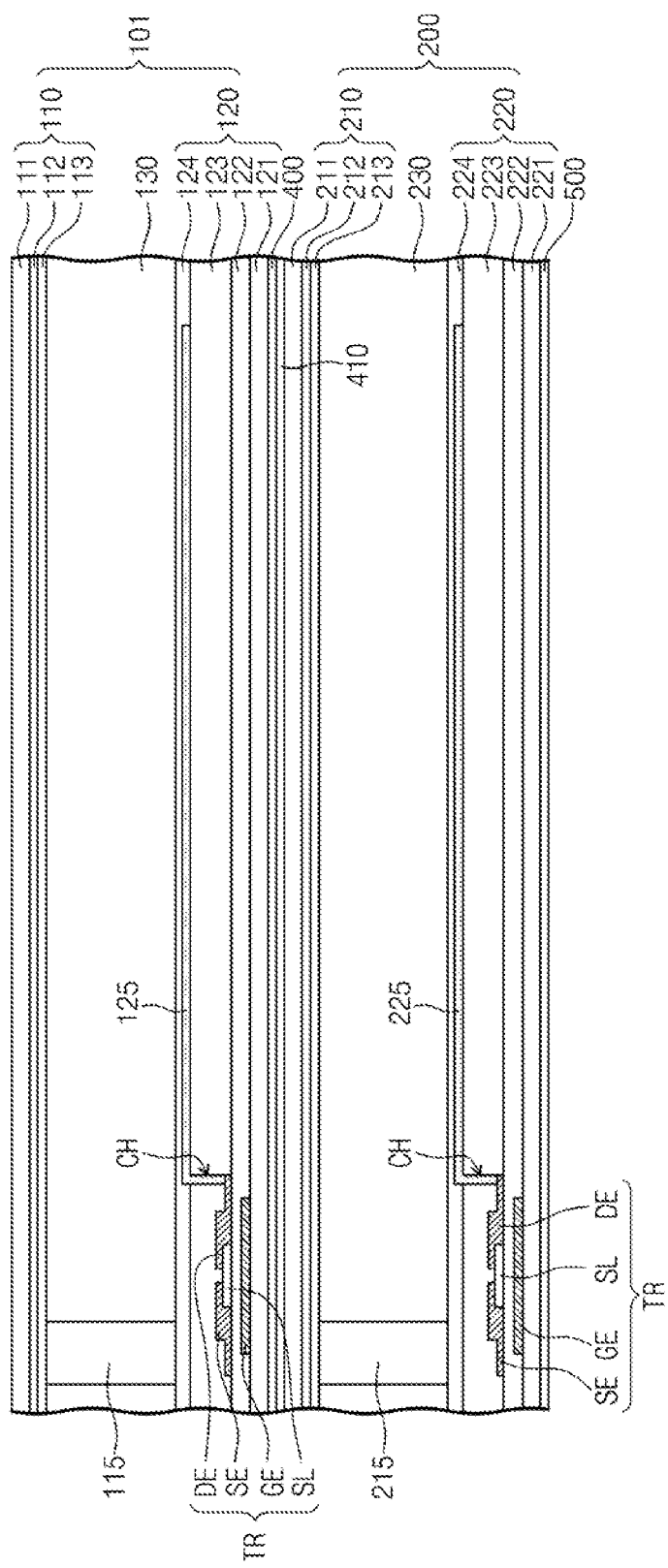
FIG. 7 is a sectional view showing a display panel including the first and second display panels of FIG. 1 according to another exemplary embodiment of the present invention.

FIG. 7 is a sectional view showing a display panel including the first and second display panels of FIG. 1 according to another exemplary embodiment of the present invention.

In the following description, the same reference numbers will be designated to components that are substantially the same as those of FIG. 2, and these components and structures will largely not be further described, in order to avoid redundancy.

The display panel includes a first display panel 101, the second display panel 200, a first light absorbing polarizer 410, and the second light absorbing polarizer 500.

The first display panel 101 includes the first substrate 110, the second substrate 120 facing the first substrate 110, and the first liquid crystal layer 130 interposed between the first and second substrates 110 and 120. The first liquid crystal layer 130 includes cholesteric liquid crystal having a reflection region having a wavelength shorter than or longer than the wavelength of a visible ray. In other words, the first liquid crystal layer 130 includes cholesteric liquid crystal having a reflection region having a wavelength of about 380 nm or less, or about 770 nm or more.

The cholesteric liquid crystal enters various states depending upon the electric field applied thereto. In detail, the cholesteric liquid crystal has a homeotropic state formed at a higher voltage to transmit incident light, a planar state formed at a lower voltage to reflect light of certain wavelengths, and a focal conic state formed at an intermediate voltage between the higher and lower voltages to scatter the incident light.

In the focal conic state, a part of light incident upon the cholesteric liquid crystal passes through the cholesteric liquid crystal and is scattered in or around a front portion thereof. Another part of the light does not pass through the cholesteric liquid crystal, but is instead scattered at a rear portion thereof.

When the wavelength of the reflectance region of the cholesteric liquid crystal is shorter than or longer than that of visible light, the cholesteric liquid crystal in the planar state acts as an isotropic material with respect to the visible ray, and the visible ray passes through the cholesteric liquid crystal without phase change. In addition, in the planar state, the cholesteric liquid crystal reflects infrared or UV rays.

When the wavelength of the reflectance region of the cholesteric liquid crystal is shorter than or longer than that of visible light, the cholesteric liquid crystal scatters incident light in the focal conic state.

Therefore, when the first display panel 101 is used as a reflective display panel, grayscales can be represented by using two states of the cholesteric liquid crystal: the planar state and the focal conic state.

The second display panel 200 includes the third substrate 210, the fourth substrate 220 facing the third substrate 210, and the second liquid crystal layer 230 interposed between the third and fourth substrates 210 and 220. The second liquid crystal layer 230 may include twisted nematic liquid crystal, vertically aligned liquid crystal, cholesteric liquid crystal, or homogeneous aligned liquid crystal.

The first light absorbing polarizer 410 is interposed between the first and second display panels 101 and 200, and the second light absorbing polarizer 500 is provided below the fourth substrate 221. Each of the first and second light absorbing polarizers 410 and 500 absorbs light oscillating in one direction, and transmits light oscillating in another direction substantially perpendicular to the one direction.

The display panel may further include the light reflective polarizer 400 interposed between the second substrate 121 and the first light absorbing polarizer 410. In detail, the light reflective polarizer 400 may be arranged in such a manner that the transmission axis of the light reflective polarizer 400 is parallel to the transmission axis of the first light absorbing polarizer 410. However, according to embodiments, the light reflective polarizer 400 may be used instead of the first light absorbing polarizer 410. In other words, only the light reflective polarizer 400 may be used, without the first light absorbing polarizer 410.

The light reflective polarizer 400 is interposed between the first and second display panels 101 and 200 to reflect light oscillating in one direction, and to transmit light oscillating in another direction substantially perpendicular to the one direction. The light reflective polarizer 400 reflects light scattered by the focal conic state of the first liquid crystal layer 130 upward (i.e., outward) from the first display panel 101, so that light use efficiency can be improved.

Although not shown in the figures, a display panel including the cholesteric liquid crystal is placed below another display panel to act as a reflective plate or a transparent plate according to applied voltages. In detail, when the cholesteric liquid crystal is in its focal conic state, incident light is reflected, so that the display panel acts as a reflective plate. When the liquid crystal is in its planar state, incident light is transmitted, so that the display panel acts as a transparent plate.

FIGS. 8A to 8D are views showing the display panel of FIG. 7 and the operating principle thereof according to an exemplary embodiment of the present invention, and elements serving as actual optical components are shown in FIGS. 8A to 8D.

Referring to FIGS. 8A to 8D, the first liquid crystal layer 130 includes cholesteric liquid crystal having a reflection region having a wavelength smaller than or longer than the wavelength of visible light, and the second liquid crystal layer 230 includes vertically aligned liquid crystal.

The first light absorbing polarizer 410 has transmission axis TA in which light oscillating in parallel to the first direction D1 is transmitted, and also has an absorption axis in which light oscillating in parallel to the second direction D2, substantially perpendicular to the first direction D1, is absorbed. The second light absorbing polarizer 500 has a transmission axis TA in which light oscillating in parallel to the second direction D2 is transmitted, and an absorption axis in which light oscillating in parallel to the first direction D1 is absorbed.

The first and third alignment layers 113 and 213 are aligned at an angle of about 45 degrees with respect to the first and second directions D1 and D2. In other words, the first and third alignment layers 113 and 213 are aligned in the third direction D3. The second and fourth alignment layers 124 and 224 are aligned in a direction opposite to the third direction D3 while being parallel to a rubbing direction RD of the first and third alignment layers 113 and 213.

FIGS. 8A to 8D show only the transmission axes TA of the first and second light absorbing polarizers 410 and 500. Further, in FIGS. 8A to 8D, the light oscillating in the first direction D1 is marked roughly as "↔", and the light oscillating in the second direction D2 is marked roughly as "↕".

Figure 8A:
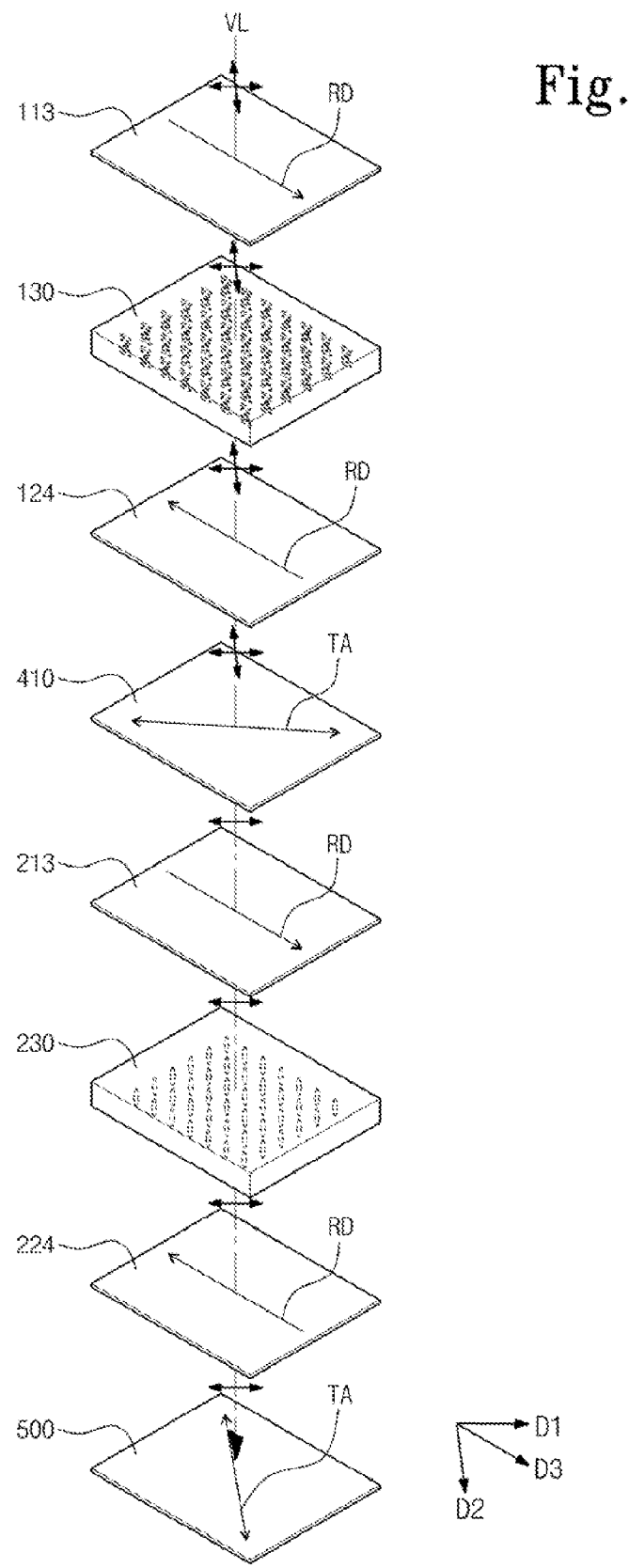
FIGS. 8A to 8D are views showing the display panel of FIG. 7 and the operating principle thereof according to an exemplary embodiment of the present invention.
Figure 8B:
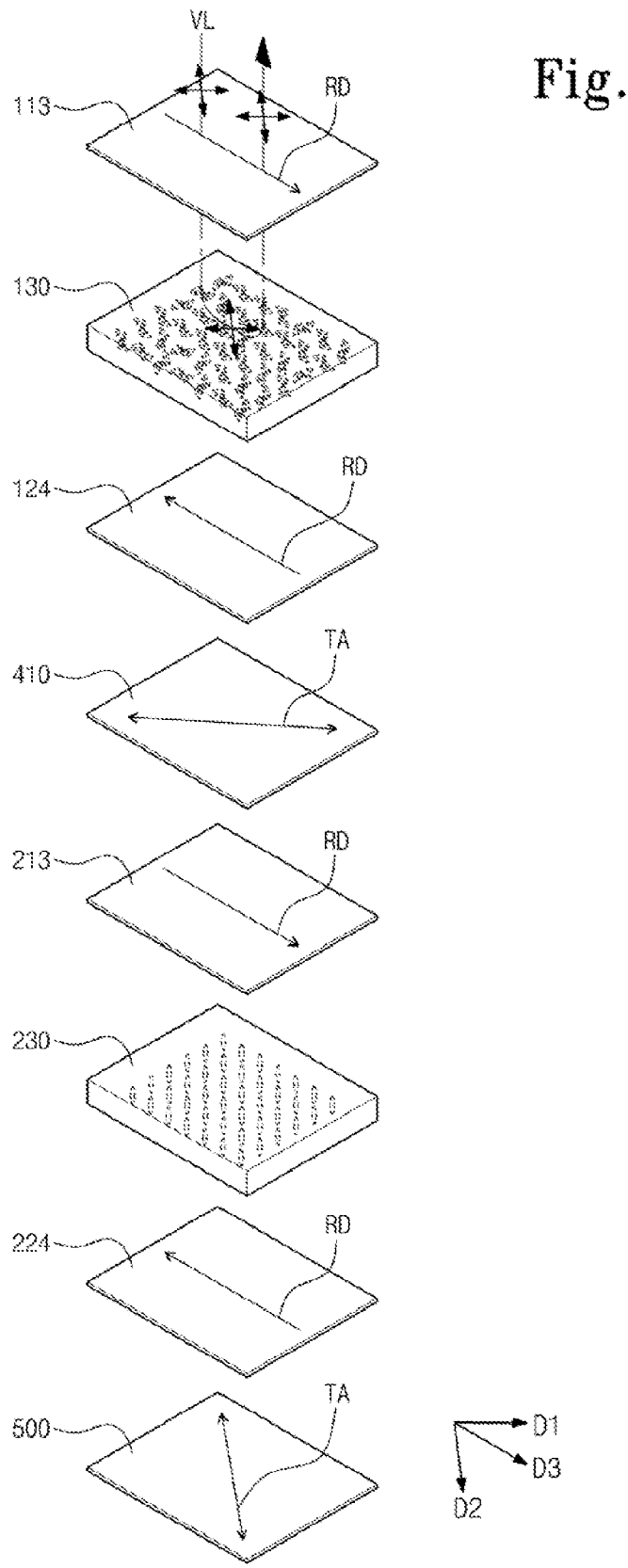

FIGS. 8A and 8B show a method in which the display panel displays an image by using external light Ex_L, that is, a method in which the display panel displays the image in a reflective mode.

Referring to FIG. 8A, when no electric field is applied to the first liquid crystal layer 130, the first liquid crystal layer 130 is thus in its planar state. Accordingly, a visible light ray VL, passes through the first liquid crystal layer 130 without phase change. A part of the visible ray VL, which has passed through the first liquid crystal layer 130 and oscillates in the first direction D1 while being parallel to the transmission axis TA of the first light absorbing polarizer 410, is transmitted through the first light absorbing polarizer 410. A part of the visible ray VL, which oscillates in the second direction D2 while being parallel to the absorption axis of the first light absorbing polarizer 410, is absorbed by the first light absorbing polarizer 410. When no electric field is applied to the second liquid crystal layer 230, the visible ray VL passes through the second liquid crystal layer 230 without phase change. Since visible rays VL which have passed through the second liquid crystal layer 230 oscillate in parallel to the absorption axis of the second light absorbing polarizer 500, these rays are absorbed by the second light absorbing polarizer 500. Therefore, when no electric field is applied to the first and second liquid crystals, light is not reflected back out of the display panel, and the display panel represents a black grayscale.

Referring to FIG. 8B, when an electric field is applied to the first liquid crystal layer 130, the cholesteric liquid crystal of the first liquid crystal layer 130 has a focal conic state. Therefore, when visible rays VL are incident from an external source (i.e. ambient light, or light from a source external to the display panel), the visible rays are scattered by the first liquid crystal layer 130 and transmitted out of the display panel. Therefore, when an electric field is applied to the first liquid crystal layer 130, the display panel can represent a white grayscale, and adjust the intensity of the electric field applied to the first liquid crystal layer 130 to represent a plurality of grayscales.

Accordingly, in the reflective mode, the signal applied to the first display panel 101 can be adjusted, thereby displaying an image.

Figure 8C:
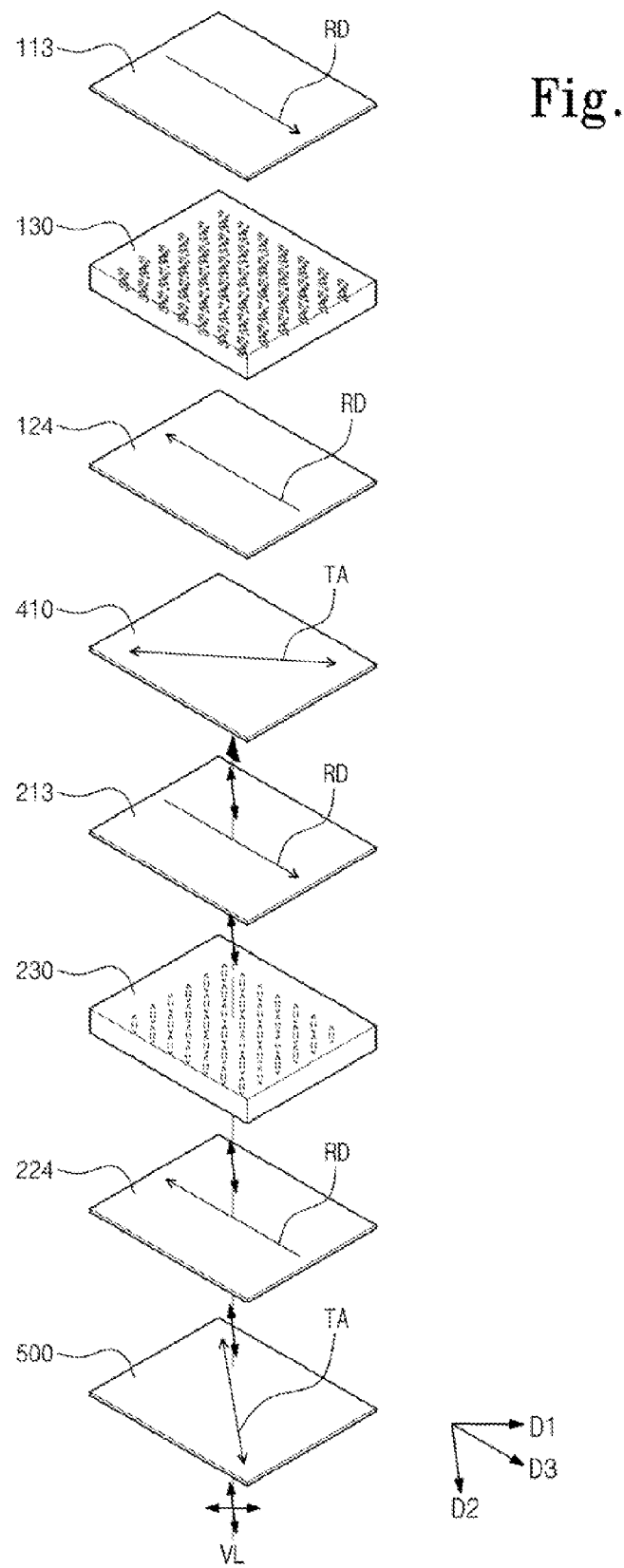
Figure 8D:
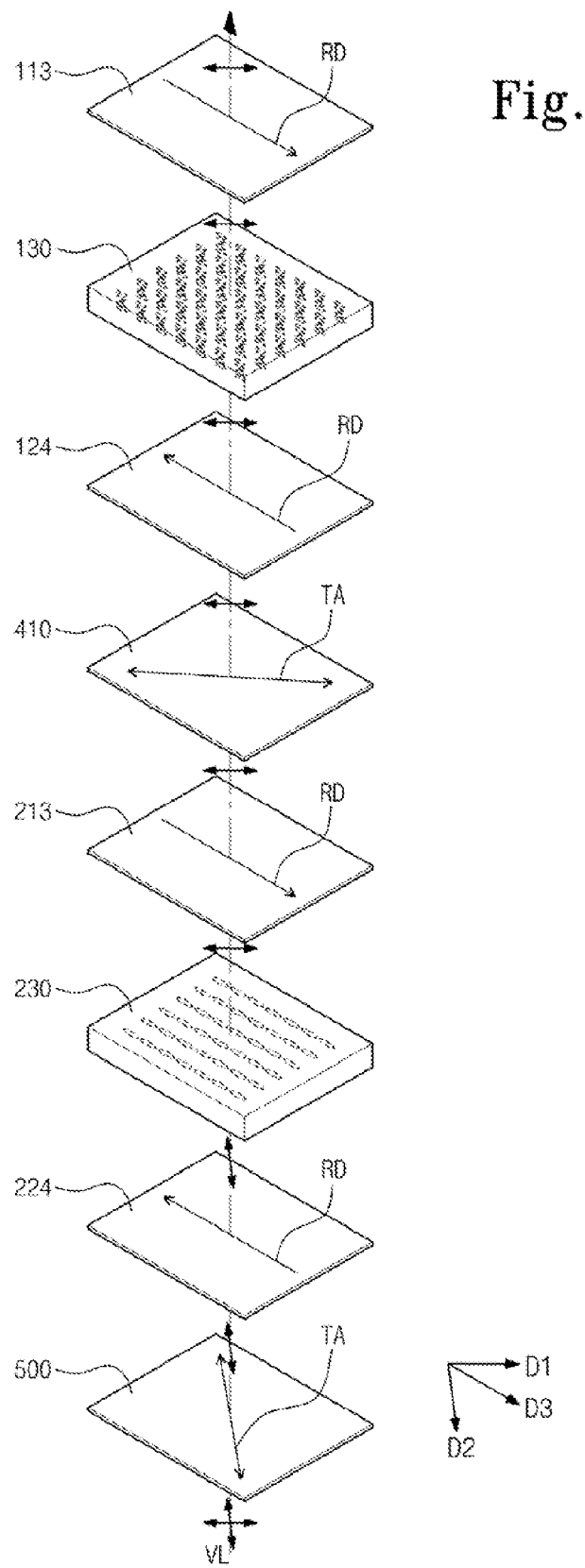

FIGS. 8C and 8D show a method in which the display panel displays an image by using light emitted from the backlight unit 60, that is, a method in which the display panel displays an image in a transmissive mode.

Referring to FIG. 8C, visible ray VL is incident from the backlight unit 60 while oscillating in the first and second directions D1 and D2, but only the portion oscillating in the second direction D2 passes through the second light absorbing polarizer 500, and the portion oscillating in the first direction D1 is absorbed by the second light absorbing polarizer 500. When no electric field is applied to the second liquid crystal layer 230, the visible ray VL passes through the second liquid crystal layer 230 without phase change. Light which has passed through the second liquid crystal layer 230 oscillates in parallel to the absorption axis of the second light absorbing polarizer 410, and is thus absorbed by the second light absorbing polarizer 410. Accordingly, when no electric field is applied to the second liquid crystal layer 230, light incident from the backlight unit 60 is not transmitted out of the display panel, and the display panel can represent a black grayscale.

Referring to FIG. 8D, a visible ray VL is incident from the backlight unit 60 while oscillating in the first and second directions D1 and D2, but only the visible ray VL oscillating in the second direction D2 passes through the second light absorbing polarizer 500. The visible ray VL oscillating in the first direction D1 is absorbed by the second light absorbing polarizer 500. When an electric field is applied to the second liquid crystal layer 230, the liquid crystal of the second liquid crystal layer 230 is aligned in parallel to the rubbing direction RD, and the phase of the visible ray VL is changed by 90 degrees when the visible ray VL passes through the second liquid crystal layer 230. Therefore, since the visible ray VL that has passed through the second liquid crystal layer 230 oscillates in parallel to the transmission axis TA of the first light absorbing polarizer 410, the visible ray VL is transmitted through the first light absorbing polarizer 410. When no electric field is applied to the first liquid crystal layer 130, the visible ray VL passes through the first liquid crystal layer 130 without phase change. Therefore, when the electric field is applied to the second liquid crystal layer 230, light incident from the backlight unit 60 is transmitted out of the display panel, and the display panel can represent a white grayscale. In addition, the display panel can adjust the intensity of the electric field applied to the second liquid crystal layer 230 to represent a plurality of grayscales.

Therefore, in the transmissive mode, the signal applied to the second display panel 200 can be adjusted, thereby displaying an image.

Figure 9:
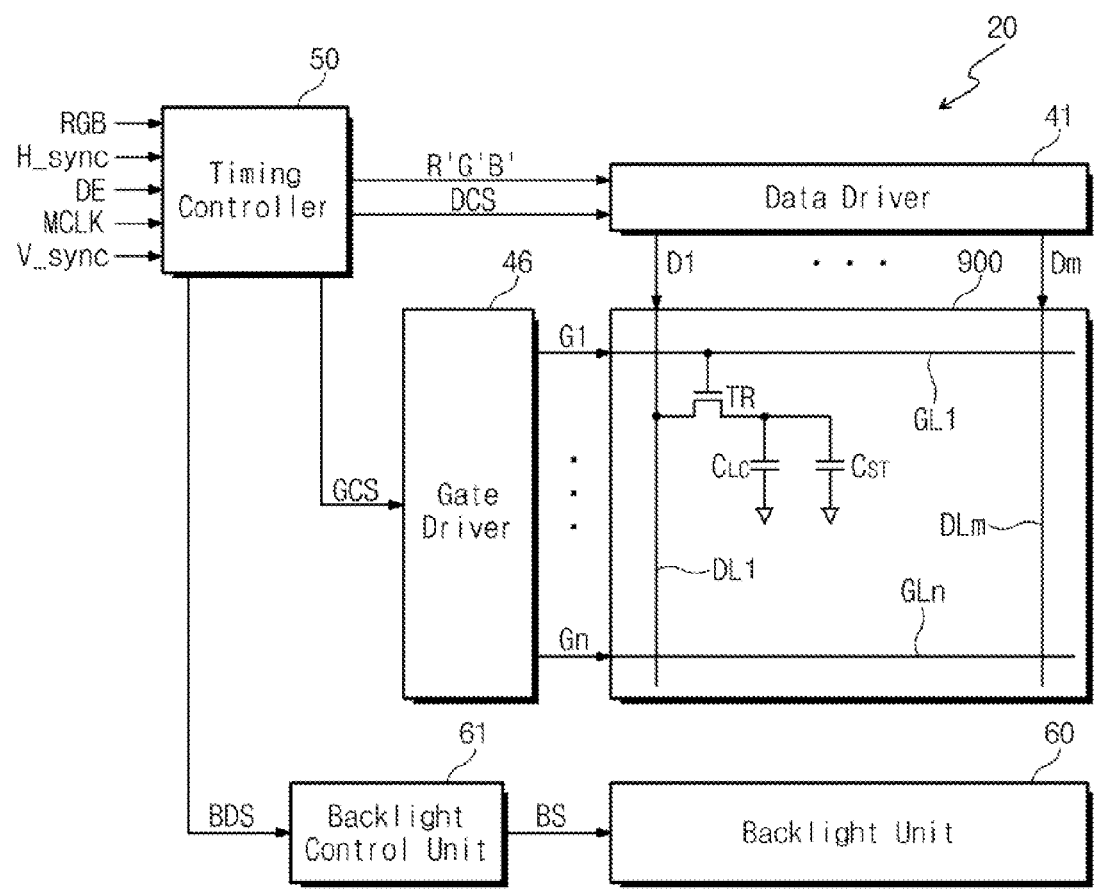
FIG. 9 is a block diagram showing a display apparatus according to another exemplary embodiment of the present invention.

FIG. 9 is a block diagram showing a display apparatus 20 according to another exemplary embodiment of the present invention.

In the following description, the same reference numbers will be designated to components and structures that are substantially the same as those of FIG. 1, and these components and structures will largely not be further described, in order to avoid redundancy.

Referring to FIG. 9, the display apparatus 20 includes a display panel 900, the data driver 41, the gate driver 46, the timing controller 50, the backlight control circuit 61, and the backlight unit 60. The display apparatus 20 has a structure substantially identical to that of the display panel shown in FIG. 1 except that the display apparatus 20 includes one display panel rather than two.

FIG. 10 is a sectional view showing the display panel of FIG. 9 according to an exemplary embodiment of the present invention.

The display panel 900 includes a first substrate 910, a second substrate 920 facing the first substrate 910, and a liquid crystal layer 930 interposed between the first and second substrates 910 and 920. The liquid crystal layer 930 includes a cholesteric liquid crystal, in which a wavelength of a reflection region of the cholesteric liquid crystal is shorter than or longer than that of a visible ray.

When the wavelength of the reflectance region of the cholesteric liquid crystal is shorter than or longer than that of a visible ray wavelengths, the cholesteric liquid crystal has a planar state in which incident visible rays are transmitted, and a focal conic state in which incident visible rays are scattered.

Accordingly, when the display panel 900 includes a transmissive display panel, the liquid crystal of the display panel 900 can take on both a planar state and a focal conic state.

The first substrate 910 includes a first base substrate 911, a common electrode 912 provided below the first base substrate 911, and a first alignment layer 913 provided below the common electrode 912. Although not shown FIG. 10, the first substrate 910 may include color filters such as red, green, and blue color filters.

The second substrate 920 includes a second base substrate 921, the thin film transistor TR, and a pixel electrode 925.

The thin film transistor TR includes the gate electrode GE, the source electrode SE, and the drain electrode DE. The gate electrode GE branches from the gate line GL and is provided on the second base substrate 921. A gate insulating layer 922 is provided on the second base substrate 921 and the gate electrode GE. The source electrode SE branches from the data line DL and is provided on the gate insulating layer 922. The drain electrode DE is provided on the gate insulating layer 922 while being spaced apart from the source electrode SE at a predetermined distance. The semiconductor layer SL is interposed between each of the gate electrode GE and the source and drain electrodes SE and DE. An organic protective layer 923 is provided on the thin film transistor TR.

The pixel electrode 925 is provided on the organic protective layer 923 and connected to the drain electrode DE through the contact hole CH. The pixel electrode 925 forms an electric field with the common electrode 912, to adjust the alignment of the liquid crystal of the liquid crystal layer 930.

A second alignment layer 924 is provided on the organic protective layer 923 and the pixel electrode 925, to align the liquid crystal of the liquid crystal layer 930. A column spacer 915 is provided between the first and second substrates 910 and 920, to maintain the gap between the first and second substrates 910 and 920 at a substantially uniform distance.

When a transflective display apparatus in related art is used in the reflective mode, the first and the second display panels are utilized and incident light passes twice through the liquid crystal layer. Accordingly, a parallax phenomenon arises because path lengths of incident light between the reflective mode and the transmissive mode are different.

When exemplary embodiments of the present invention is used in the reflective mode, the first display panel is utilized and incident light passes only one through the liquid crystal layer so that a parallax phenomenon can be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a first display panel comprising a plurality of first pixels, the first display panel further comprising a first substrate, a second substrate facing the first substrate, and a first liquid crystal layer interposed between the first and second substrates;
   a second display panel facing the first display panel and comprising a plurality of second pixels, the second display panel further comprising a third substrate facing the second substrate, a fourth substrate facing the third substrate, and a second liquid crystal layer interposed between the third and fourth substrates;
   a reflective polarizer interposed between the first and second display panels and positioned between the second and third substrates, so as to transmit a light polarized in a first direction and reflect a light polarized in a second direction substantially perpendicular to the first direction;
   a backlight unit positioned a rear surface or a lateral surface of the second display panel to supply a light to the first and second display panels;
   a first light absorbing polarizer provided on the first substrate;
   a second light absorbing polarizer provided on the fourth substrate;
   a first alignment layer interposed between the first substrate and the first liquid crystal layer;
   a second alignment layer interposed between the first liquid crystal layer and the second substrate;
   a third alignment layer interposed between the third substrate and the second liquid crystal layer; and
   a fourth alignment layer interposed between the second liquid crystal layer and the fourth substrate.

2. The display apparatus of claim 1, wherein the first display panel is configured to display an image using light supplied from an external source, and the second display panel is configured to display an image using light from the backlight unit.

3. The display apparatus of claim 2, further comprising:
   a timing controller for outputting an image signal and a control signal;
   a first driving circuit connected between the timing controller and the first display panel to drive the first display panel; and
   a second driving circuit connected between the timing controller and the second display panel to drive the second display panel,
   wherein the timing controller is configured to receive a panel selecting signal selecting a display panel to be driven from the first and second display panels, and to supply the image signal and the control signal to either the first driving circuit or the second driving circuit according to the panel selecting signal.

4. The display apparatus of claim 3, wherein the backlight unit supplies the light when the second display panel is driven.

5. The display apparatus of claim 1, wherein the first and second liquid crystal layers each comprise vertically aligned liquid crystal.

6. The display apparatus of claim 5, wherein the first light absorbing polarizer comprises a transmission axis oriented substantially parallel to the first direction, the second light absorbing polarizer comprises a transmission axis oriented substantially parallel to the second direction, and the first to fourth alignment layers are aligned at an angle of about 45 degrees with respect to the first direction or the second direction.

7. The display apparatus of claim 1, wherein the first and second liquid crystal layers each comprise twisted nematic liquid crystal.

8. The display apparatus of claim 7, wherein the first light absorbing polarizer has a transmission axis oriented substantially parallel to the second direction, the second light absorbing polarizer has a transmission axis oriented substantially parallel to the first direction, the first alignment layer is aligned substantially in the second direction, the second and third alignment layers are aligned substantially in the first direction, and the fourth alignment layer is aligned substantially in the first direction.

9. The display apparatus of claim 1:
   wherein the first display panel comprises a first electrode provided on either the first substrate or the second substrate, and a second electrode spaced apart from the first electrode at a predetermined distance, the first display panel configured to display an image according to an electric field formed between the first and second electrodes, and
   wherein the second display panel comprises a third electrode provided on either the third substrate or the fourth substrate, and a fourth electrode spaced apart from the third electrode at a predetermined distance, the second display panel configured to display an image according to an electric field formed between the third and fourth electrodes.

10. The display apparatus of claim 9, wherein the first light absorbing polarizer has a transmission axis oriented substantially parallel to the first direction, and the second light absorbing polarizer has a transmission axis oriented substantially parallel to the second direction.

* * * * *

UNITED STATES PATENT AND TRADEMARK OFFICE
CERTIFICATE OF CORRECTION

PATENT NO.         : 8,872,746 B2                                           Page 1 of 1
APPLICATION NO.    : 13/222981
DATED              : October 28, 2014
INVENTOR(S)        : Byoungho Cheong et al.

It is certified that error appears in the above-identified patent and that said Letters Patent is hereby corrected as shown below:

On the title page item (73), should read:

Assignee(s): Samsung Display Co., Ltd.
               Republic of Korea

Pusan National University Industry-University Cooperation Foundation
                Republic of Korea Signed and Sealed this
Twenty-sixth Day of April, 2016

Michelle K. Lee
*Director of the United States Patent and Trademark Office*